United States Patent
Ohta et al.

(10) Patent No.: US 7,000,394 B2
(45) Date of Patent: *Feb. 21, 2006

(54) RANKINE CYCLE DEVICE

(75) Inventors: Naoki Ohta, Wako (JP); Naoki Itoh, Wako (JP); Tsuneo Endoh, Wako (JP); Tsutomu Takahashi, Wako (JP); Kensuke Honma, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/363,539

(22) PCT Filed: Sep. 4, 2001

(86) PCT No.: PCT/JP01/07657

§ 371 (c)(1),
(2), (4) Date: Jul. 21, 2003

(87) PCT Pub. No.: WO02/20951

PCT Pub. Date: Mar. 14, 2002

(65) Prior Publication Data

US 2004/0103661 A1 Jun. 3, 2004

(30) Foreign Application Priority Data

Sep. 5, 2000 (JP) .............................. 2000-273556

(51) Int. Cl.
*F01K 7/34* (2006.01)
(52) U.S. Cl. .......................................... 60/653; 60/670
(58) Field of Classification Search ................. 60/651, 60/659, 671, 618, 653, 679, 670
See application file for complete search history.

(56) References Cited

U.S. PATENT DOCUMENTS

| | | | | |
|---|---|---|---|---|
| 4,407,131 A | * | 10/1983 | Wilkinson | 60/648 |
| 5,634,339 A | * | 6/1997 | Lewis et al. | 60/650 |
| 6,513,482 B1 | * | 2/2003 | Endoh et al. | 123/227 |
| 6,598,397 B1 | * | 7/2003 | Hanna et al. | 60/651 |
| 6,732,525 B1 | * | 5/2004 | Endoh et al. | 60/618 |

FOREIGN PATENT DOCUMENTS

| | | |
|---|---|---|
| JP | 57-26363 A | 2/1982 |
| JP | 58-48706 A | 3/1983 |
| JP | 4-47104 A | 2/1992 |

* cited by examiner

*Primary Examiner*—Hoang Nguyen
(74) *Attorney, Agent, or Firm*—Birch, Stewart, Kolasch & Birch, LLP

(57) ABSTRACT

A Rankine cycle system is provided in which, with regard to a given relationship between the pressure (Pevp) and the temperature (Tevp) of a vapor that is taken into an expander (4) that includes a cylinder chamber in a first stage and a vane chamber in a second stage, the chambers being disposed in line, the expansion ratio of the vapor that the expander (4) takes in and discharges is set at a predetermined expansion ratio ($\epsilon$) according to the given relationship so that the pressure (Pexp2) and the temperature (Texp2) of the vapor that is discharged from the expander (4) coincide with target values, thereby making the expander (4) and the condenser (5) exhibit maximum performance. Since the vapor within the cylinder chamber in the first stage is in a superheated vapor region and contains no water, the phenomenon of water hammer will not be caused in the cylinder chamber. Furthermore, since the vapor at the exit of the vane chamber is in a saturated vapor region and contains water, the vane chamber can be lubricated and sealed by means of the water.

16 Claims, 19 Drawing Sheets

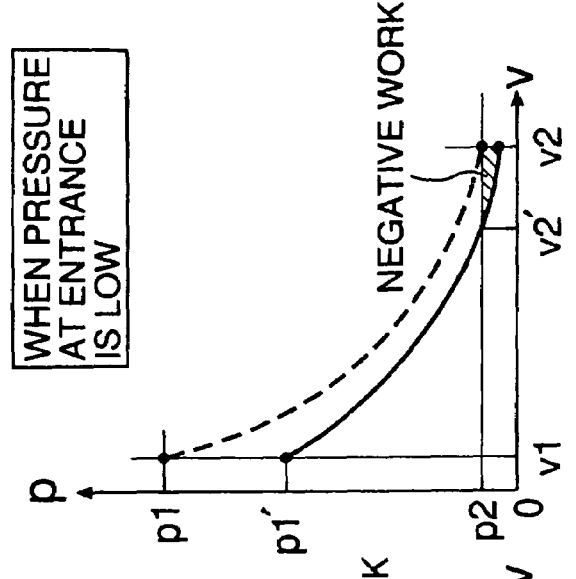
FIG.21A WITH RATED VALUES / WORK DONE BY VAPOR
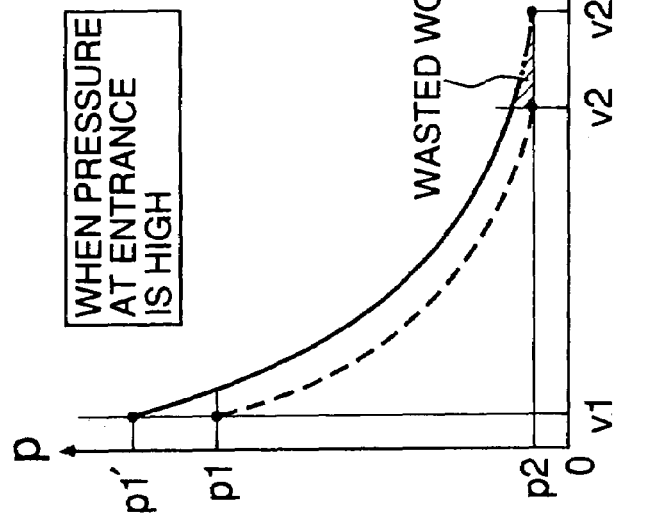
FIG.21B WHEN PRESSURE AT ENTRANCE IS HIGH / WASTED WORK
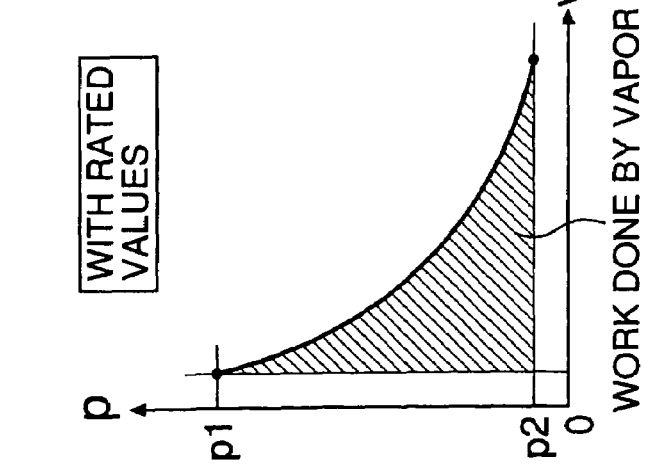
FIG.21C WHEN PRESSURE AT ENTRANCE IS LOW / NEGATIVE WORK

RANKINE CYCLE DEVICE

This application is the national phase under 35 U.S.C. § 371 of PCT International Application No. PCT/JP01/07657 which has an International filing date of Sep. 4, 2001, which designated the United States of America.

The present invention relates to a Rankine cycle system that includes an evaporator for heating a liquid and generating a vapor, an expander for expanding the vapor supplied from the evaporator and outputting a constant shaft torque, and a condenser for cooling the vapor discharged from the expander and turning it back into a liquid.

BACKGROUND ART

Japanese Patent Application Laid-open No. 4-47104 discloses a Rankine cycle system in which an expander is operated by a vapor generated by an evaporator, and the vapor discharged from the expander is liquefied in a condenser and returned to the evaporator, wherein a valve provided in an entrance of the expander is opened and closed according to the magnitude of energy of the vapor generated by the evaporator so as to control the timing with which the vapor is supplied to the expander, thus ensuring a maximum output torque.

Furthermore, Japanese Patent Application Laid-open No. 58-48706 discloses a Rankine cycle system in which an expander is operated by a vapor generated by an evaporator, and the vapor discharged from the expander is liquefied in a condenser and returned to the evaporator, wherein when the vapor introduction pressure of the condenser is higher than the vapor discharge pressure of the expander, a bypass passage is opened so as to reduce overexpansion loss of the expander, the bypass passage providing a connection between the entrance side of the condenser and a position of the expander immediately before the position where expansion is completed.

Moreover, Japanese Patent Application Laid-open No. 61-87990 discloses a vane-type compressor in which a rotary valve is provided on a rotating shaft of a rotor supporting vanes, the rotary valve controlling intake and exhaust of a vane chamber, and the intake timing and the exhaust timing of the rotary valve are made variable.

For example, with regard to a Rankine cycle system in which water is heated by an evaporator that carries out heat-exchange with exhaust gas of an internal combustion engine to generate a vapor, the vapor operates a displacement-type expander so as to produce a shaft output, and the vapor discharged from the expander is turned back into water by a condenser and supplied again to the evaporator, the pressure and temperature of the vapor supplied from the evaporator to the expander are preset at rated values according to the performance of the expander, and the temperature of the vapor discharged from the expander into the condenser is preset at a rated value according to the performance of the condenser. However, the pressure and temperature of the vapor generated in the evaporator vary according to the transient state of the evaporator, the operational state of the internal combustion engine, the amount of water supplied to the evaporator, etc., and the vapor pressure and temperature at which the condenser can exhibit maximum performance also vary according to the transient state of the condenser, the cooling state of the condenser (temperature of external air, rotational speed of a cooling fan, strength of air flow), etc.

In FIG. 21A, the ordinate and the abscissa denote a pressure p and a specific volume v of vapor respectively, and when a vapor which has a rated pressure $p_1$ at the entrance of the expander expands within the expander by a set expansion ratio $\epsilon$, which has been set in advance, and the pressure at the exit of the expander changes from this $p_1$ to a rated value $p_2$, the expander and the condenser can exhibit maximum performance. However, as hereinbefore described, the pressure at the entrance of the expander varies due to various factors, and the pressure at the exit of the expander at which the expander and the condenser can exhibit maximum performance also varies due to various factors. There is therefore a possibility that the pressure at the exit of the expander might not coincide with the pressure at which the expander and the condenser can exhibit maximum performance, thus preventing the expander and the condenser from exhibiting satisfactory performance.

That is, as shown in FIG. 21B, in the case where, even if the expansion ratio coincides with the set expansion ratio $\epsilon$, the pressure at the entrance of the expander is $p_1'$, which is much larger than the rated value $p_1$, the pressure at the exit of the expander becomes higher than the rated value $p_2$, vapor that still has energy to drive the expander is wastefully discharged, the performance of the expander cannot be exhibited satisfactorily and, moreover, the load imposed on the condenser increases, thus degrading the condensation performance, which is a problem. On the other hand, as shown in FIG. 21C, in the case where, even if the expansion ratio coincides with the set expansion ratio $\epsilon$, the pressure at the entrance of the expander is $p_1'$, which is much smaller than the rated value $p_1$, since the pressure at the exit of the expander becomes lower than the rated value $p_2$, the vapor performs negative work within the expander, thus reducing the output, which is a problem.

Such problems similarly occur in the case where the temperature at the entrance of the expander is higher or lower than the rated value, in the case where the leak rate of vapor within the expander is large or small, or in the case where the pressure at the exit of the expander at which the expander and the condenser can exhibit maximum performance has changed from the rated value $p_2$ due to various factors.

DISCLOSURE OF THE INVENTION

The present invention has been achieved in view of the above-mentioned circumstances, and the object thereof is to make an expander and a condenser of a Rankine cycle system exhibit maximum performance.

In order to accomplish the above-mentioned object, in accordance with a first aspect of the present invention, there is proposed a Rankine cycle system that includes an evaporator for heating a liquid and generating a vapor, an expander for expanding the vapor supplied from the evaporator and outputting a shaft torque, and a condenser for cooling the vapor discharged from the expander and turning the vapor back into the liquid, characterized in that with regard to a given relationship between the pressure and the temperature of the vapor that is taken into the expander, an expansion ratio of the vapor that is taken into and discharged from the expander is set at a predetermined expansion ratio according to the given relationship so that the pressure and the temperature of the vapor that is discharged from the expander coincide with target values.

In accordance with this arrangement, even when the pressure and the temperature of the vapor that is taken into the expander are in a given relationship, by setting the expansion ratio of the vapor that is taken into and discharged from the expander at the predetermined ratio according to the given relationship, the pressure and the temperature of the vapor that is discharged from the expander can be controlled. By setting the expansion ratio so as to give target values for the pressure and the temperature at which the expander and the condenser can exhibit maximum performance, the pressure and the temperature of the vapor that is discharged from the expander can be made to coincide with the target values, thereby enabling the expander and the condenser to exhibit maximum performance.

Furthermore, in accordance with a second aspect of the present invention, in addition to the first aspect, there is proposed a Rankine cycle system in which the pressure and the temperature of the vapor taken into the expander are in a superheated vapor region, and the pressure and the temperature of the vapor discharged from the expander are in a saturated vapor region.

In accordance with this arrangement, since the vapor taken into the expander is in the superheated vapor region and contains no liquid, and the vapor discharged from the evaporator is in the saturated vapor region and contains a liquid, the condenser load for turning the vapor back into a liquid can be lightened while minimizing the influence of liquid on operation of the expander.

Moreover, in accordance with a third aspect of the present invention, in addition to the first aspect, there is proposed a Rankine cycle system in which the expander includes a plurality of expansion chambers that are connected to each other in line, and the product of the expansion ratios of the vapor in each of the expansion chambers is made to be the set expansion ratio.

In accordance with this arrangement, the plurality of expansion chambers are connected to each other in line, the shaft torques generated by each of the expansion chambers are combined and output, and the product of the expansion ratios of the vapor in each of the expansion chambers is made to be the set expansion ratio, thereby maximizing the condensation efficiency of the condenser.

Furthermore, in accordance with a fourth aspect of the present invention, in addition to the third aspect, there is proposed a Rankine cycle system in which, among the plurality of expansion chambers of the expander, the vapor of at least the expansion chamber on the most upstream side is in a superheated vapor region, and the vapor of at least the expansion chamber on the most downstream side is in a saturated vapor region.

In accordance with this arrangement, since the vapor of, among the plurality of expansion chambers, at least the expansion chamber on the most upstream side is in the superheated vapor region and contains no liquid, and the vapor of, among the plurality of expansion chambers, at least the expansion chamber on the most downstream side is in the saturated vapor region and contains a liquid, the condenser load for turning the vapor back into a liquid can be lightened while minimizing the influence of liquid on operation of the expander.

Moreover, in accordance with a fifth aspect of the present invention, in addition to the fourth aspect, there is proposed a Rankine cycle system in which the expansion chamber that has vapor at a discharge position thereof in a superheated vapor region is formed from a cylinder chamber.

In accordance with this arrangement, since the vapor at the discharge position of the expansion chamber, which is formed from the cylinder chamber, is in the superheated vapor region, it is possible to prevent a liquid from being mixed in the vapor, and problems caused by a liquid residing in the cylinder chamber can be avoided.

Furthermore, in accordance with a sixth aspect of the present invention, in addition to the fourth aspect, there is proposed a Rankine cycle system in which the expansion chamber that has vapor at a discharge position thereof in a saturated vapor region is formed from a vane chamber.

In accordance with this arrangement, since the vapor at the discharge position of the expansion chamber, which is formed from the vane chamber, is in the saturated vapor region, a liquid can be mixed in the vapor, thus improving vane lubrication and sealing properties.

Moreover, in accordance with a seventh aspect of the present invention, in addition to the third aspect, there is proposed a Rankine cycle system in which, among the plurality of expansion chambers of the expander, an intake position of at least the expansion chamber on the most upstream side is made variable.

In accordance with this arrangement, making variable the intake position of, among the plurality of expansion chambers, at least the expansion chamber on the most upstream side can change the pressure of the vapor that is taken into the expander, thereby changing the expansion ratio of the overall expander from the set expansion ratio. Because of this, even if the pressure and the temperature of the vapor taken into the expander fall outside the predetermined relationship, changing the expansion ratio of the vapor that is taken into and discharged from the expander from the set expansion ratio can make the pressure and temperature of the vapor discharged from the expander coincide with the target values.

Furthermore, in accordance with an eighth aspect of the present invention, in addition to the third aspect, there is proposed a Rankine cycle system in which, among the plurality of expansion chambers of the expander, a discharge position of at least the expansion chamber on the most downstream side is made variable.

In accordance with this arrangement, making variable the discharge position of, among the plurality of expansion chambers, at least the expansion chamber on the most downstream side can change the pressure of the vapor that is discharged from the expander, thereby changing the expansion ratio of the entire expander from the set expansion ratio. Because of this, even if the pressure and the temperature of the vapor taken into the expander fall outside the predetermined relationship, changing the expansion ratio of the vapor that is taken into and discharged from the expander from the set expansion ratio can make the pressure and the temperature of the vapor that is discharged from the expander coincide with the target values.

A cylinder member 39 of embodiments forms the expansion chamber and the cylinder chamber of the present invention, and a vane chamber 54 of the embodiments forms the expansion chamber of the present invention.

BRIEF DESCRIPTION OF THE DRAWINGS

FIG. 1 is a schematic diagram of a waste heat recovery system of an internal combustion engine, FIG. 2 is a longitudinal cross section, corresponding to a cross section along line 2—2 in FIG. 5, of an expander, FIG. 3 is a magnified cross section of the surroundings of the rotational axis in FIG. 2, FIG. 4 is a cross section along line 4—4 in FIG. 2, FIG. 5 is a cross section along line 5—5 in FIG. 2 in which an essential part is magnified, FIG. 6 is a magnified cross section along line 6—6 in FIG. 5, FIG. 7 is a magnified view of an essential part in FIG. 5, FIG. 8 is a magnified view of the surroundings of the rotational axis in FIG. 2, FIG. 9 is a front view of a vane main body, FIG. 10 is a side view of the vane main body, FIG. 11 is a cross section along line 11—11 in FIG. 9, FIG. 12 is a front view of a seal, FIG. 13 is a magnified view of the surroundings of the rotational axis in FIG. 4, FIG. 14 is a diagram showing an arrangement of a control system of the expander, FIG. 15 is a graph showing changes in the pressures of first and second expansion chambers and expansion ratios, FIG. 16 is a graph showing an optimum relationship between the temperature and the pressure at the entrance of the expander, FIG. 17 is a TS diagram of a Rankine cycle system, FIG. 18 is an HS diagram of the Rankine cycle system, and FIG. 19 is a graph showing a relationship between the temperature and the degree of dryness at the exit of the expander.

FIG. 21A to FIG. 21C are graphs showing changes in the pressure and specific volume of vapor in an expander.

BEST MODES FOR CARRYING OUT THE INVENTION

Figure 1:
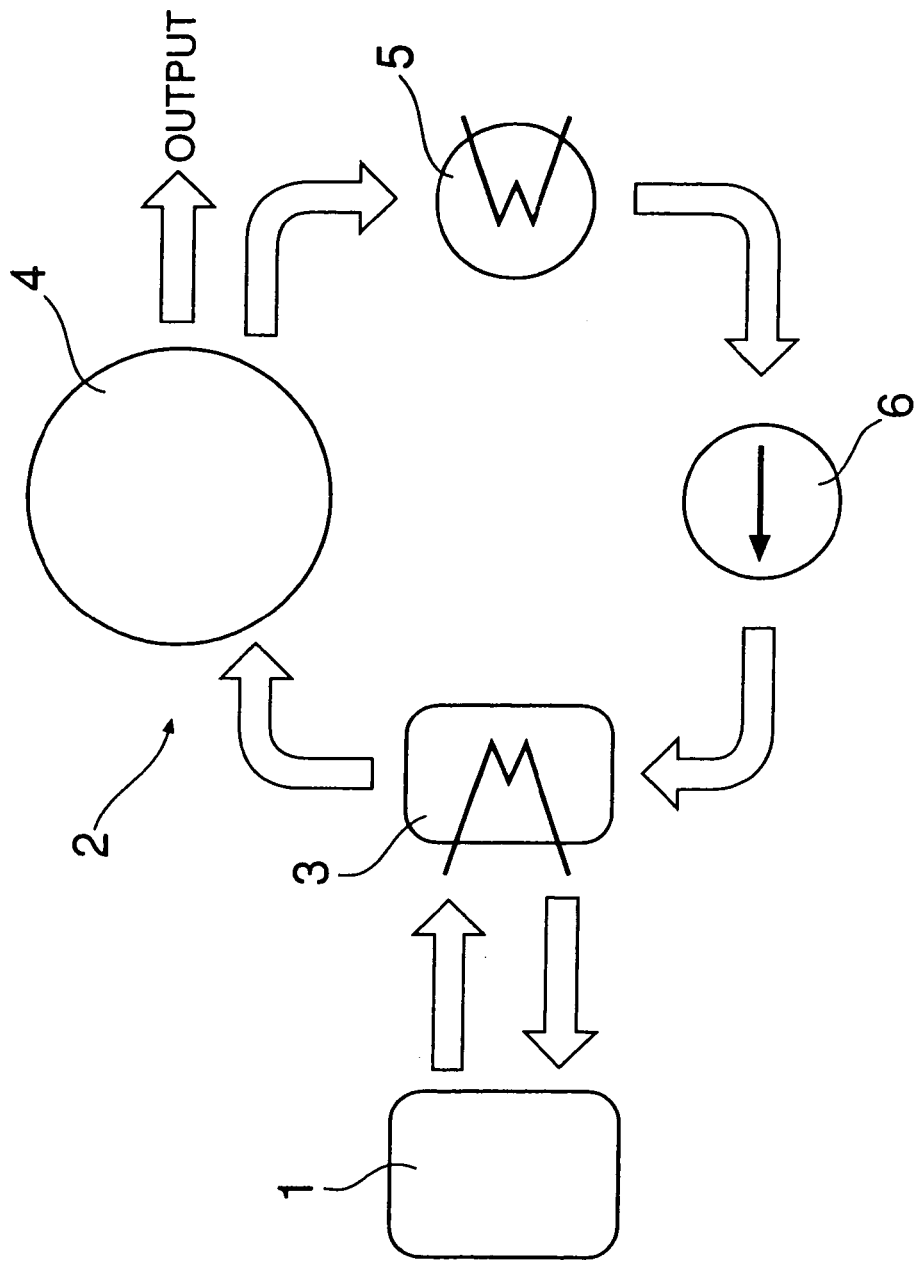
FIG. 1 to FIG. 19 illustrate a first embodiment of the present invention.

In FIG. 1, a waste heat recovery system 2 for an internal combustion engine 1 has an evaporator 3, an expander 4, a condenser 5, and a feed pump 6, the evaporator 3 generating a high temperature, high pressure vapor, that is, a vapor in a high pressure state obtained by increasing the temperature of a liquid, for example water, in a high pressure state, using as a heat source waste heat, for example exhaust gas, of the internal combustion engine 1, the expander 4 generating an output as a result of expansion of the high temperature, high pressure vapor, the condenser 5 liquefying the vapor that is discharged from the expander 4 and that has reduced temperature and reduced pressure after the expansion, that is, a reduced temperature, reduced pressure vapor, and the feed pump 6 pressure-feeding a liquid from the condenser 5, for example water, to the evaporator 3.

The expander 4 has a special structure and is arranged as follows.

In FIG. 2 to FIG. 7, a casing 7 is formed from metallic first and second halves 8, 9. The two halves 8, 9 are each formed from a main body 11 having a substantially elliptical recess 10 and a circular flange 12 integral with the main body 11, and superimposing the two circular flanges 12 via a metal gasket 13 forms a substantially elliptical rotor chamber 14. The outer surface of the main body 11 of the first half 8 is covered with a main body 16 of a shell-shaped member 15, the main body 16 forming a deep bowl shape, a circular flange 17 integral with the main body 16 is superimposed on the circular flange 12 of the first half 8 via a gasket 18, and the three flanges 12, 12, 17 are secured by bolts 19 at a plurality of positions in the circumferential direction. A transit chamber 20 is thereby formed between the two main bodies 11, 16 of the shell-shaped member 15 and the first half 8.

The main bodies 11 of the two halves 8, 9 have hollow bearing tubes 21, 22 projecting outward from the outer surfaces thereof, and a large diameter part 24 of a hollow output shaft 23 running through the rotor chamber 14 is rotatably supported by these hollow bearing tubes 21, 22 via bearing metals (or resin bearings) 25. As a result, the axis L of the output shaft 23 passes through the point of intersection of the major and minor axes of the substantially elliptical rotor chamber 14. A small diameter part 26 of the output shaft 23 projects outward from a hole 27 present in the hollow bearing tube 22 of the second half 9 and is connected to a transmission shaft 28 via a spline coupling 29. A gap between the small diameter part 26 and the hole 27 is sealed by two sealing rings 30.

A circular rotor 31 is housed within the rotor chamber 14, a shaft mounting hole 32 at the center of the circular rotor 31 and the large diameter part 24 of the output shaft 23 fit together, and a meshing coupling part 33 is provided between the two parts 31, 24. Since the rotational axis of the rotor 31 thereby coincides with the axis L of the output shaft 23, 'L' is used as a common reference symbol for these rotational axes.

Formed on the circumference of the rotor 31 at equal intervals are a plurality, twelve in this embodiment, of slot-shaped spaces 34 extending radially from the shaft mounting hole 32 around the rotational axis L. Each of the spaces 34 is narrow in the circumferential direction and has a substantially U shaped form in a virtual plane perpendicular to the two end surfaces 35 of the rotor 31 so that it opens in succession on the two end surfaces 35 and the outer periphery 36.

Mounted within the respective slot-shaped spaces 34 are 1st to 12th vane piston units U1 to U12 having identical structures, the vane piston units U1 to U12 reciprocating freely in the radial direction as follows. A stepped hole 38 is formed in a portion 37 defining the inner peripheral side of each of the substantially U-shaped spaces 34, and a stepped cylinder member 39 made of a ceramic (or carbon) is fitted in the stepped hole 38. The end surface of a small diameter part a of the cylinder member 39 abuts against the outer periphery of the large diameter part 24 of the output shaft 23, and a small diameter hole b of the cylinder member 39 communicates with a through hole c opening on the outer periphery of the large diameter part 24. A guide tube 40 is disposed outside the cylinder member 39 so as to be positioned coaxially with the member 39. The outer end of the guide tube 40 engages with an opening of the space 34 present on the outer periphery 36 of the rotor 31, and the inner end of the guide tube 40 is fitted in a large diameter hole d of the stepped hole 38 and abuts against the cylinder member 39. The guide tube 40 has a pair of long slots e extending from its outer end to the vicinity of its inner end while opposing each other, and both long slots e face the space 34. A piston 41 made of a ceramic is slidably fitted within a large diameter cylinder hole f of the cylinder member 39, the forward end of the piston 41 always being positioned within the guide tube 40.

Figure 2:
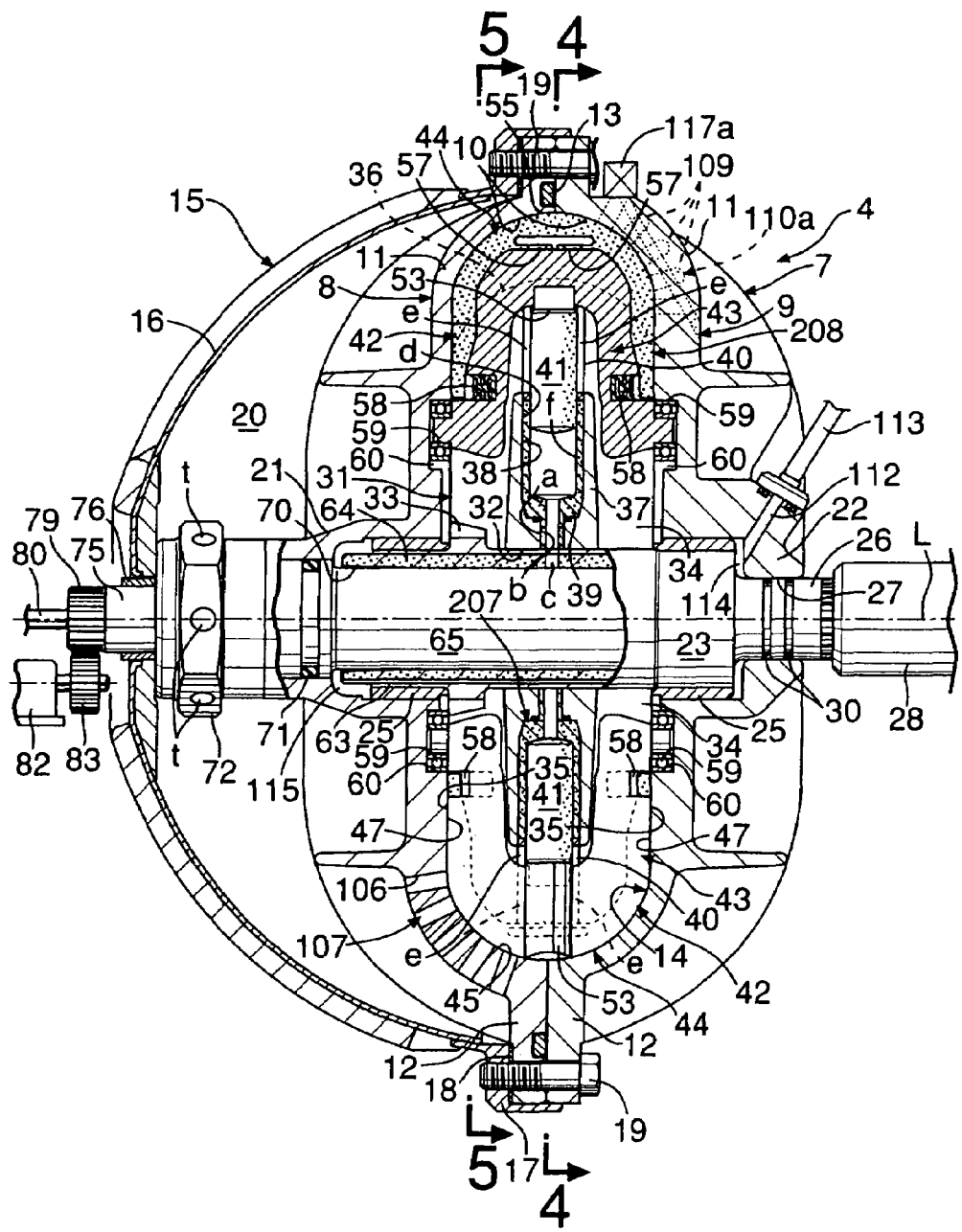
Figure 8:
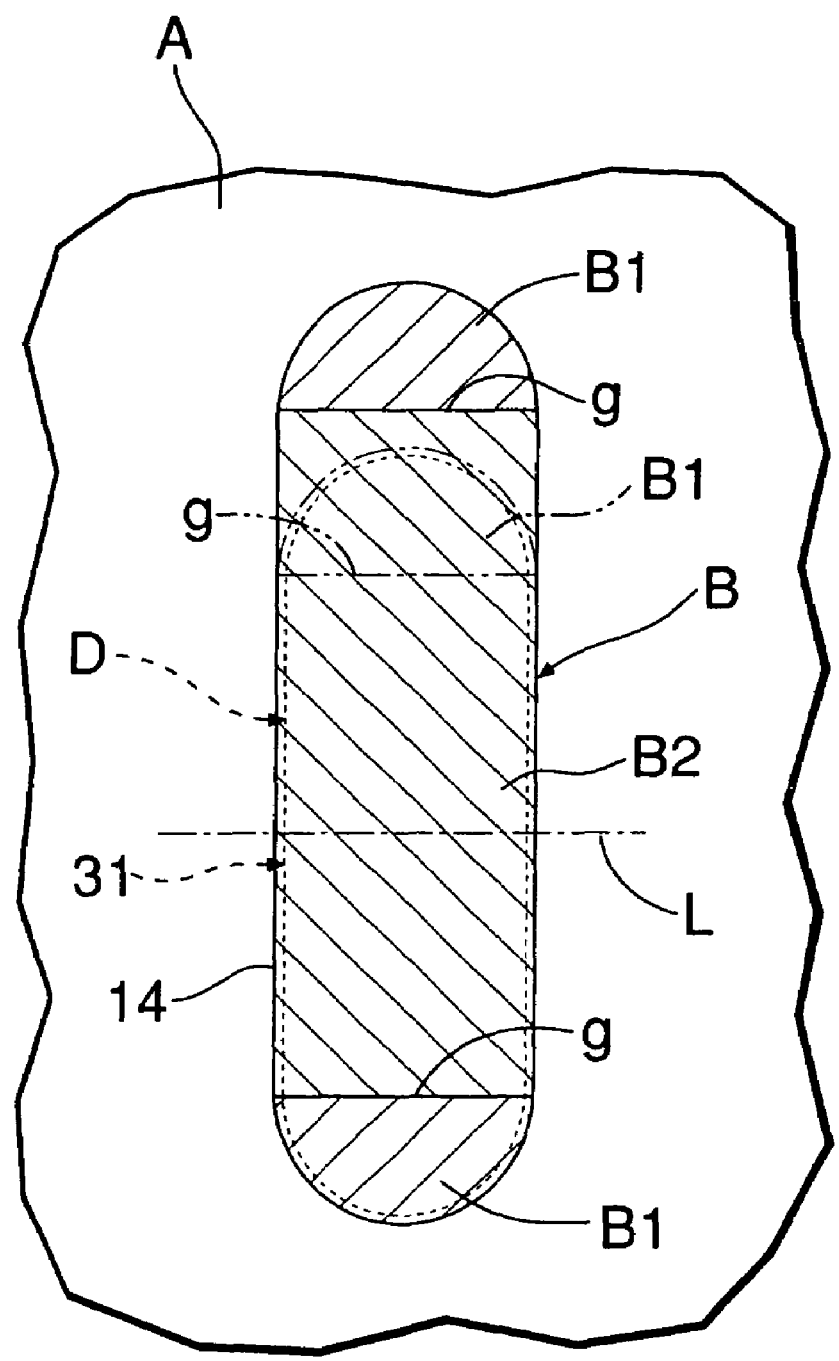
Figure 9:
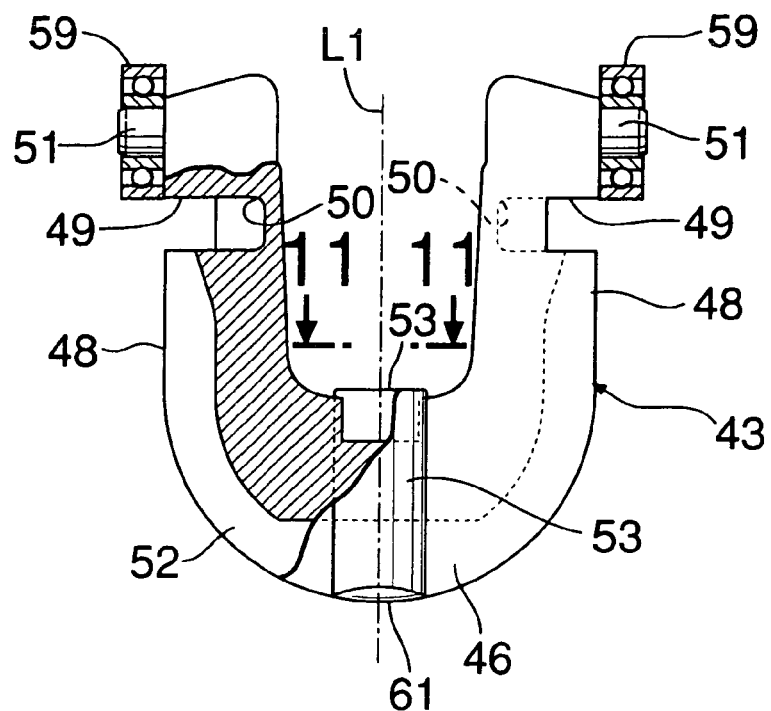
Figure 10:
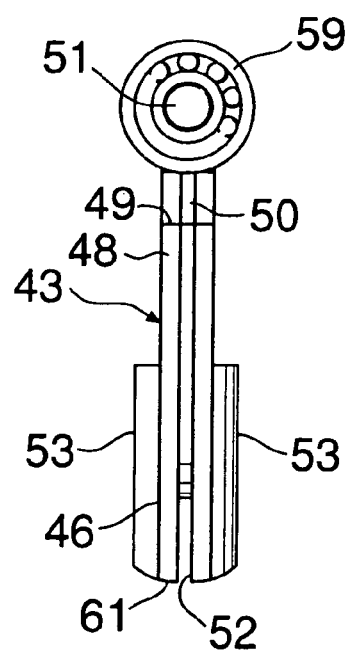
Figure 11:
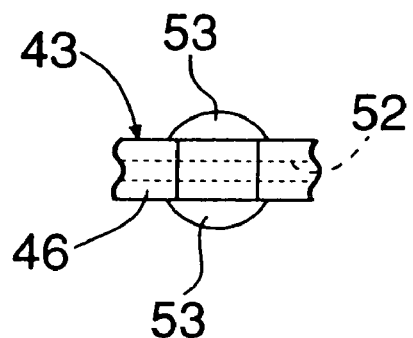
Figure 12:
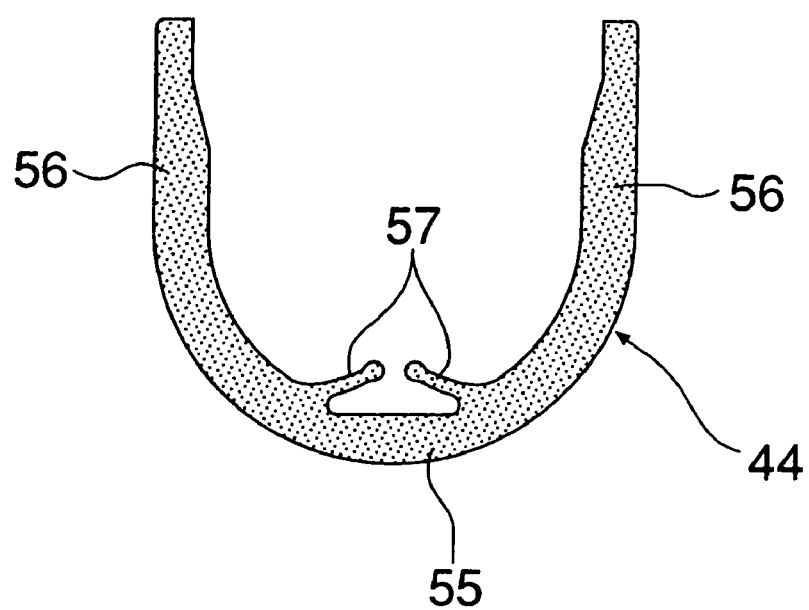

As shown in FIG. 2 and FIG. 8, a section B of the rotor chamber 14 within a virtual plane A containing the rotational axis L of the rotor 31 is formed from a pair of semicircular cross sections B1 whose diameters g are made to face each other, and a rectangular cross section B2 formed by linking together one of the opposite ends of each of the two diameters S of the two semicircular cross sections B1 and the other of the opposite ends of each of the two diameters g thereof, the section B forming a substantially 'athletic track' shape. In FIG. 8, the section denoted by the solid line shows the maximum cross section containing the major axis, and on the other hand the section denoted in part by the double-dotted line shows the minimum cross section containing the minor axis. The rotor 31, as shown by the dotted line in FIG. 8, has a cross section D slightly smaller than the minimum cross section containing the minor axis of the rotor chamber 14.

As clearly shown in FIG. 2 and FIG. 9 to FIG. 12, a vane 42 is formed from a substantially U-shaped (horseshoe-shaped) vane main body 43, a substantially U-shaped seal 44 mounted on the vane main body 43, and a vane spring 58.

The vane main body 43 has a semicircular arc-shaped part 46 and a pair of parallel parts 48, the semicircular arc-shaped part 46 corresponding to an inner periphery 45 formed by the semicircular cross section B1 of the rotor chamber 14, and the pair of parallel parts 48 corresponding to opposing inner is end surfaces 47 formed by the. rectangular cross section B2. Provided on the end side of each of the parallel parts 48 are an angular U-shaped notch 49, a rectangular blind hole 50 opening on the base of the notch 49, and a short shaft 51 that is present on the side closer to the end than the notch 49 and projects outward. A U-shaped channel 52 opening outward is formed in succession on the outer peripheral portions of the semicircular arc-shaped part 46 and the two parallel parts 48, and opposite ends of the U-shaped channel 52 communicate with the corresponding notch 49. Furthermore, a pair of ribs 53 having an incomplete circular cross section are provided on two opposite flat portions of the semicircular arc-shaped part 46. The two ribs 53 are positioned so that an axis L1 of a virtual cylinder formed thereby coincides with a straight line that divides the gap between the two parallel parts 48 into two equal sections and divides the semicircular arc-shaped part 46 into two equal sections in the circumferential direction. The inner ends of the two ribs 53 slightly project into a space between the two parallel parts 48.

The seal 44 is formed from, for example, PTFE, and has a semicircular arc-shaped part 55 and a pair of parallel parts 56, the semicircular arc-shaped part 55 sliding on the inner periphery 45 formed by the semicircular cross section B1 of the rotor chamber 14, and the parallel parts 56 sliding on the opposing inner end surfaces 47 formed by the rectangular cross section B2. A pair of resilient lugs 57 are provided on the inner peripheral side of the semicircular arc-shaped part 55 so as to curve inward.

The seal 44 is attached to the U-shaped channel 52 of the vane main body 43, the vane spring 58 is fitted in each of the blind holes 50, and a roller 59 having a ball bearing structure is mounted on each of the short shafts 51. Each of the vanes 42 is slidably housed in the respective slot-shaped spaces 34 of the rotor 31, the two ribs 53 of the vane main body 43 being positioned is within the guide tube 40 and portions on either side of the two ribs 53 being positioned within the two long slots e of the guide tube 40, thus allowing the inner end surfaces of the two ribs 53 to abut against the outer end surface of the piston 41. The two rollers 59 are engaged in a freely rolling manner with noncircular annular channels 60 formed on the opposing inner end surfaces 47 of the first and second halves 8, 9. The distance between these annular channels 60 and the rotor chamber 14 is constant around their entire circumference. Forward movement of the piston 41 is converted into rotational movement of the rotor 31 by engagement between the rollers 59 and the annular channels 60 via the vanes 42.

Figure 5:
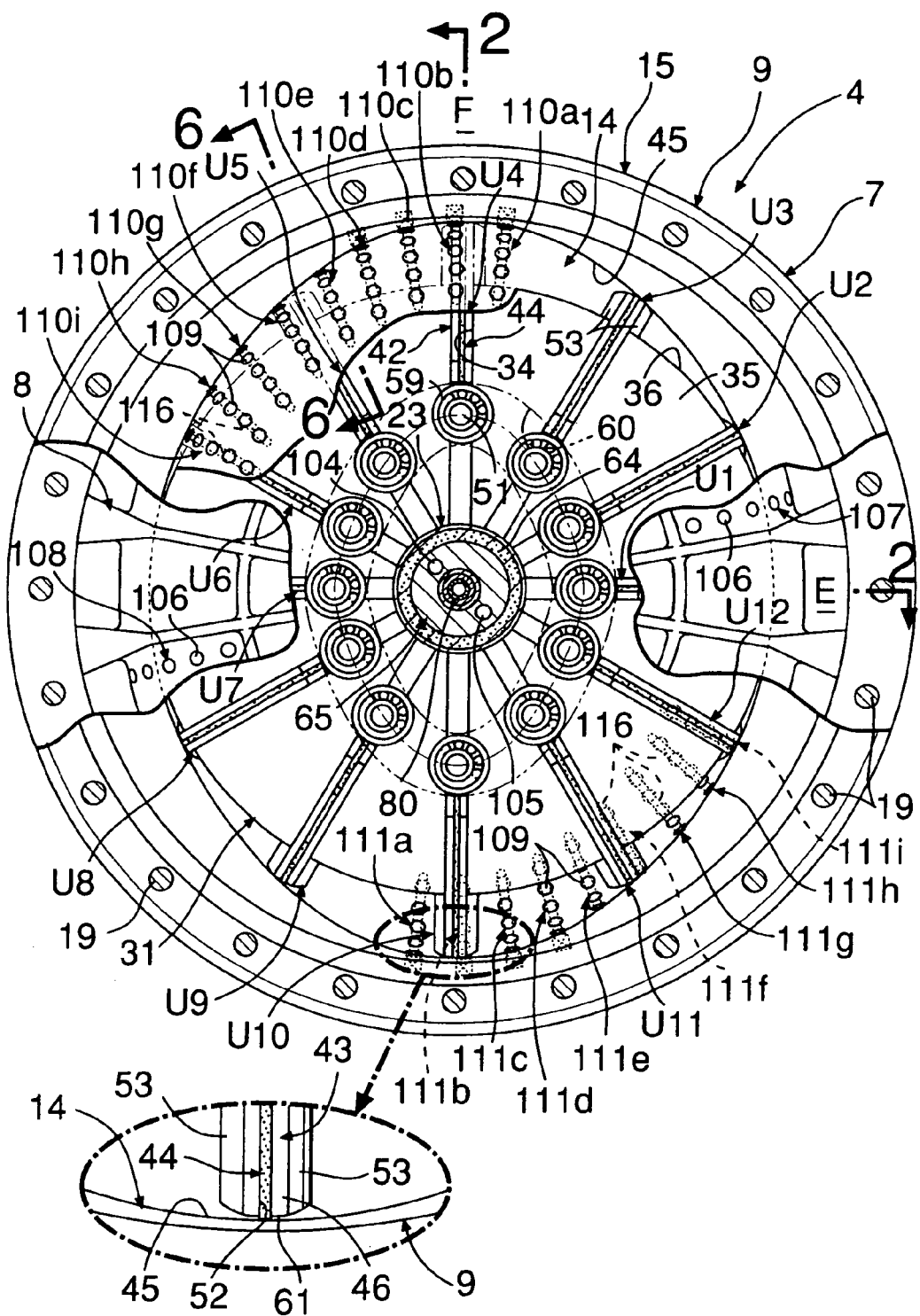
Figure 6:
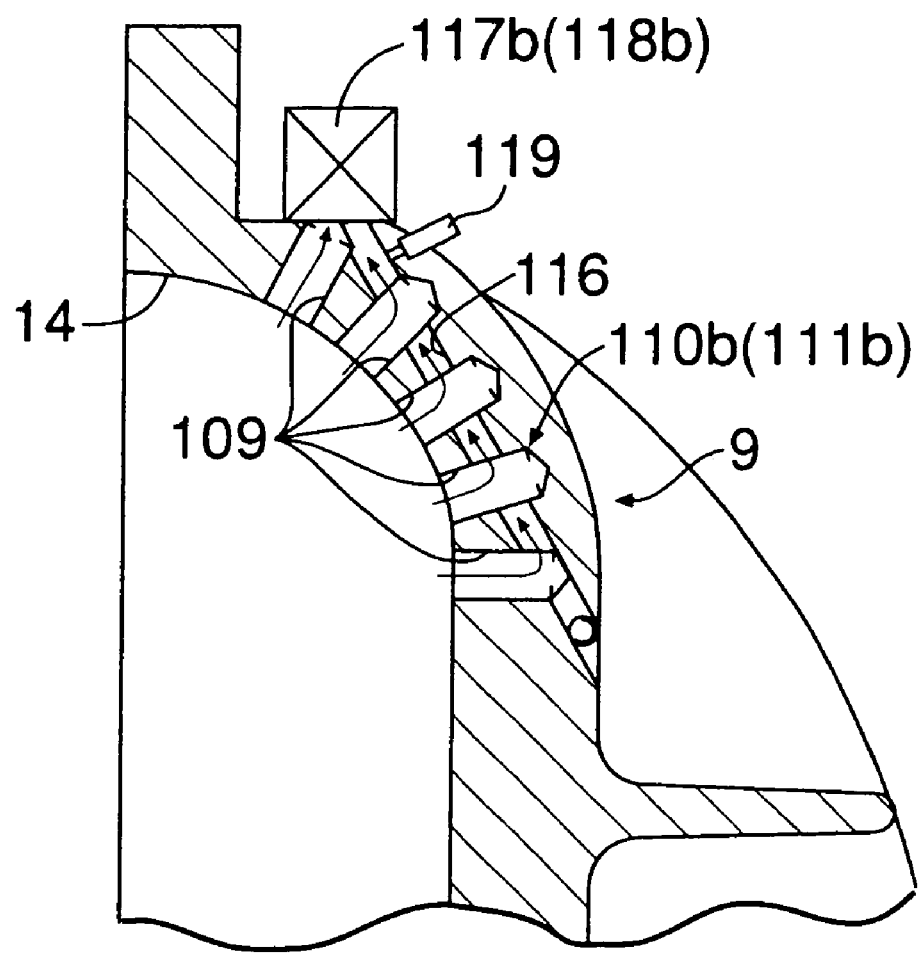
Figure 7:
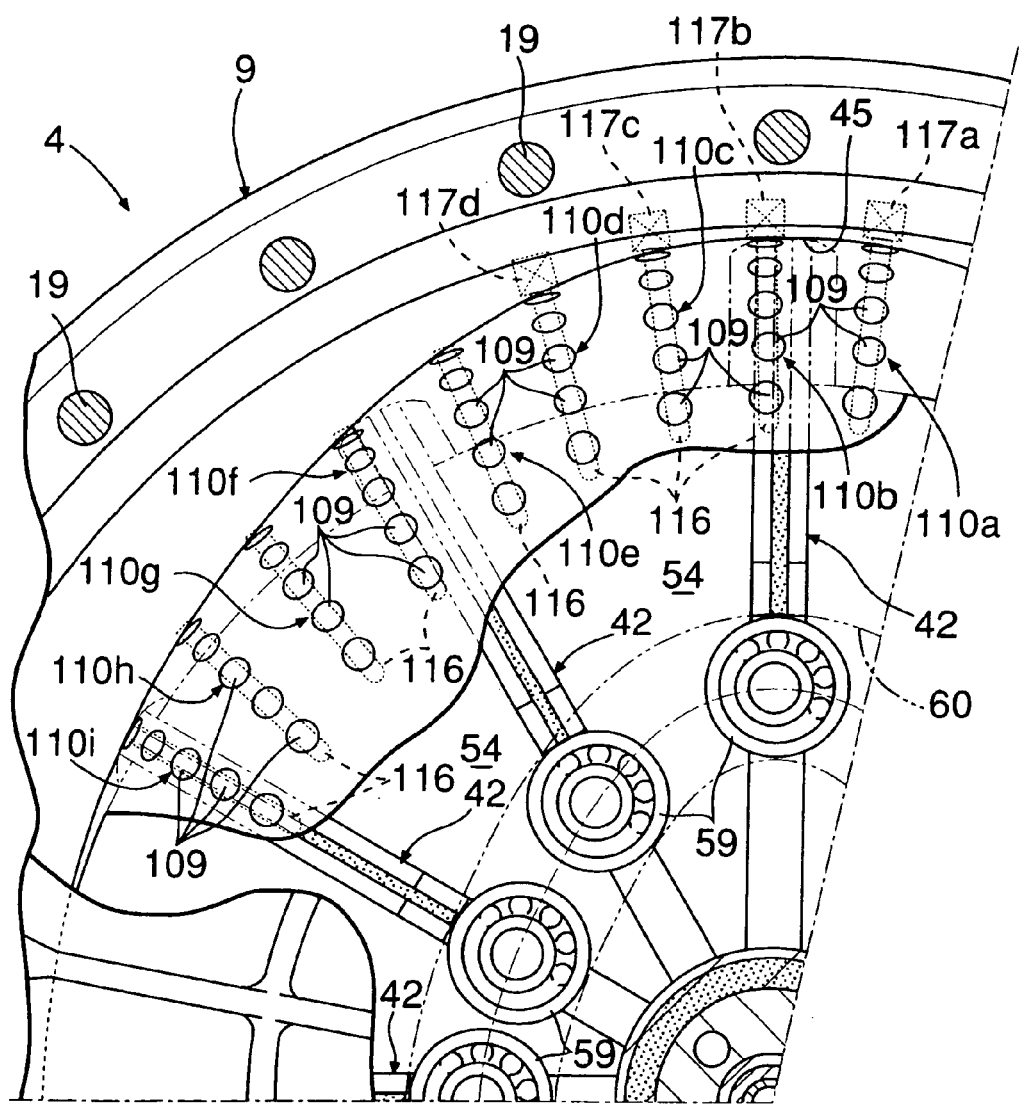

As clearly shown in FIG. 5, cooperation between the rollers 59 and the annular channels 60 can make a semicircular arc-shaped forward end surface 61 of the semicircular arc-shaped part 46 of the vane main body 43 always be at a distance from the inner periphery 45 of the rotor chamber 14 and make the two parallel parts 48 always be at a distance from the opposing inner end surfaces 47 of the rotor chamber 14, thus reducing friction loss. Since orbiting is restricted by the pair of annular channels 60, the vane 42 rotates via the rollers 59 with a microscopic displacement angle in the axial direction due to lateral orbital error, thus increasing the contact pressure with the inner periphery 45 of the rotor chamber 14. At this time, with regard to the vane main body 43, which is substantially U-shaped (horseshoe shaped), since the radial length of the part in contact with the casing 7 is shorter than that of a square (rectangular) vane, the amount of displacement can be greatly reduced. Furthermore, as clearly shown in FIG. 2, the two parallel parts 56 of the seal 44 are in close contact with the opposing inner end surfaces 47 of the rotor chamber 14 due to the resilient forces of the respective vane springs 58, thus carrying out a sealing action for the annular channels 60, in particular between the ends of the two parallel parts 56 and the vane 42. The semicircular arc part 55 is in close contact with the inner periphery 45 within the rotor chamber 14 since the two elastic lugs 57 are pressed between the vane main body 43 and the inner periphery 45. That is since, unlike a square (rectangular) vane, the substantially U-shaped vane 42 does not have a point of inflection, good contact can be achieved. A square vane has angular parts and it becomes difficult to maintain the sealing properties. The sealing properties between the vane 42 and the rotor chamber 14 can thus be improved. Moreover, the vane 42 and the rotor chamber 14 deform in response to thermal expansion. In this case, since the substantially U-shaped vane 42 deforms more uniformly and with more geometrical similarity than does a square vane, there is less variation in clearance between the vane 42 and the rotor chamber 14, and the sealing properties can be well maintained.

The sealing action between the vane main body 43 and the inner periphery 45 of the rotor chamber 14 is generated by the resilient force of the seal 44 itself, the centrifugal force acting on the seal 44 itself, and the vapor pressure that pushes the seal 44 as a result of the vapor entering the U-shaped channel 52 of the vane main body 43 from the rotor chamber 14 on the high pressure side. In this way, since the sealing action is not greatly affected by a centrifugal force acting on the vane main body 43 in response to the rotational speed of the rotor 31, the seal surface pressure does not depend on the centrifugal force imposed on the vane main body 43, and good sealing properties and low friction properties can always be achieved at the same time.

As hereinbefore described, the twelve vanes 42 radially supported on the rotor 31, the inner periphery 45 of the rotor chamber 14, and the outer periphery 36 of the rotor 31 define twelve vane chambers 54 (see FIG. 4) whose volume varies in response to rotation of the rotor 31.

Figure 3:
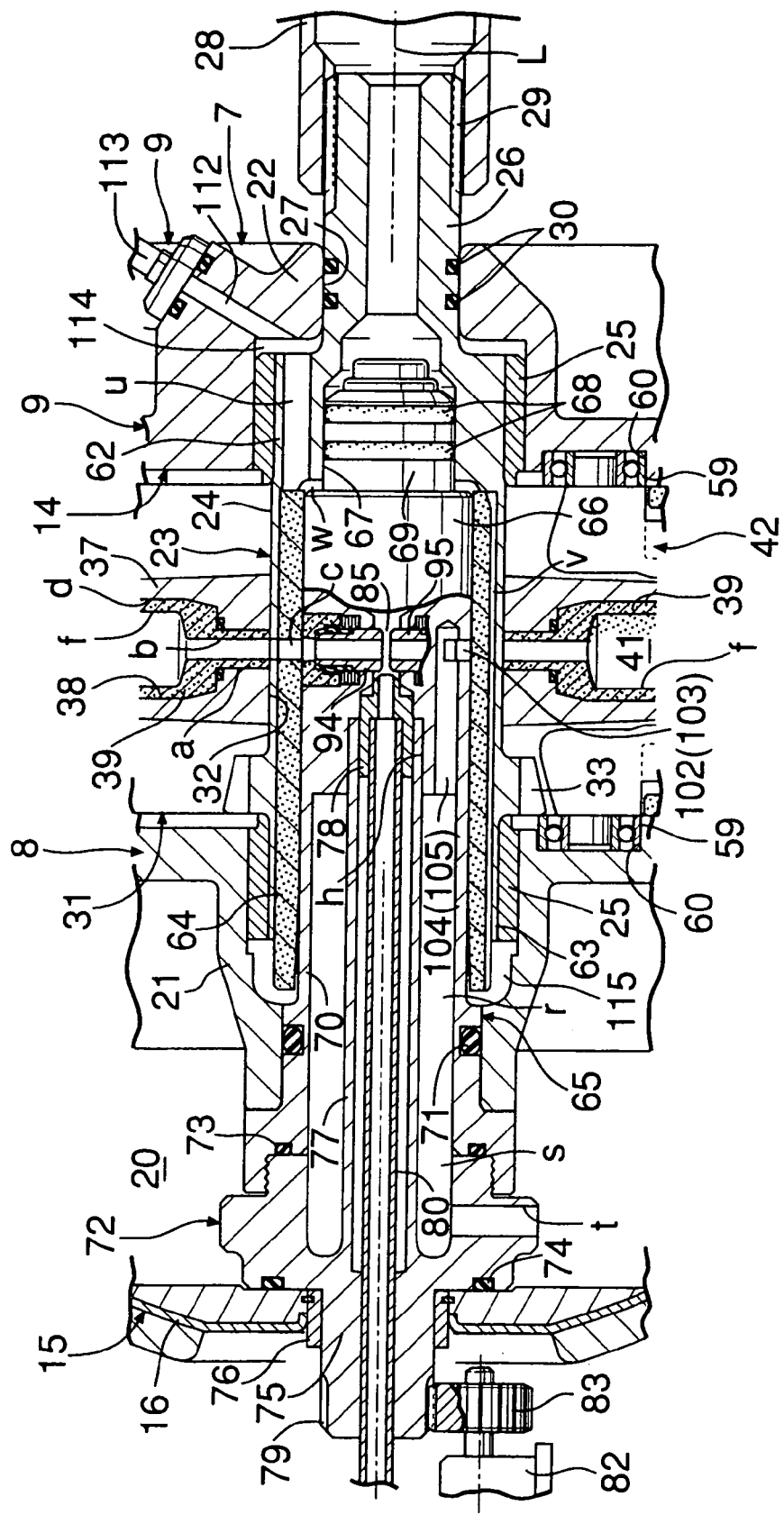

In FIG. 2 and FIG. 3, the large diameter part 24 of the output shaft 23 has a thick portion 62 supported on the bearing metal 25 of the second half 9 and a thin portion 63 extending from the thick portion 62 and supported on the bearing metal 25 of the first half 8. A hollow shaft 64 made of a ceramic (or metal) is fitted within the thin portion 63 so as to rotate integrally with the output shaft 23. A fixed shaft 65 is disposed inside the hollow shaft 64, the fixed shaft 65 having a large diameter solid part 66, a small diameter solid part 69, and a thin hollow part 70 extending from the large diameter solid part 66 and fitted within the hollow shaft 64, the large diameter solid part 66 being fitted in the hollow shaft 64 so as to be contained within the axial thickness of the rotor 31, and the small diameter solid part 69 being fitted via two sealing rings 68 in a hole 67 present in the thick portion 62 of the output shaft 23. A sealing ring 71 is disposed between the outer periphery of an end part of the hollow part 70 and the inner periphery of the hollow bearing tube 21 of the first half 8.

A hollow tube 72 is screwed via a sealing ring 73 into the left end of the fixed shaft 65, a shaft part 75 projecting on the left side of the hollow tube 72 runs through a bearing member 76 provided in the center of the shell-shaped member 15 and extends outward, and a sliding area between the hollow tube 72 and the shell-shaped member 15 is sealed by a sealing ring 74. The forward end of an inner tube part 77 extending rightward from the hollow tube 72 is fitted, together with a short hollow connection tube 78 projecting from the forward end of the inner tube part 77, into a stepped hole h present in the large diameter solid part 66 of the fixed shaft 65. A high temperature, high pressure vapor introduction tube 80 is press-fitted in the shaft part 75 projecting on the left side of the hollow tube 72 and extends rightward within the inner tube 77, and the right end of the introduction tube 80 is fitted within the hollow connection tube 78. A driven gear 79 is formed on the outer periphery of the shaft part 75 of the hollow tube 72, and a drive gear 83 provided on a rotating shaft of a motor 82 meshes with the driven gear 79. Driving the motor 82 therefore rotates the fixed shaft 65 via the drive gear 83, the driven gear 79, and the hollow tube 72, thereby generating a phase difference between the fixed shaft 65 and the output shaft 23.

As shown in FIG. 2 to FIG. 4, and FIG. 13, a rotary valve V is provided on the large diameter solid part 66 of the fixed shaft 65 as described below, the rotary valve V supplying a high temperature, high pressure vapor to the cylinder members 39 of the first to twelfth vane piston units U1 to U12 via a plurality, twelve in this embodiment, of through holes c formed continuously in the hollow shaft 64 and the output shaft 23 and, after expansion, discharging a first reduced temperature, reduced pressure vapor from the cylinder members 39 via the through holes c.

Figure 13:
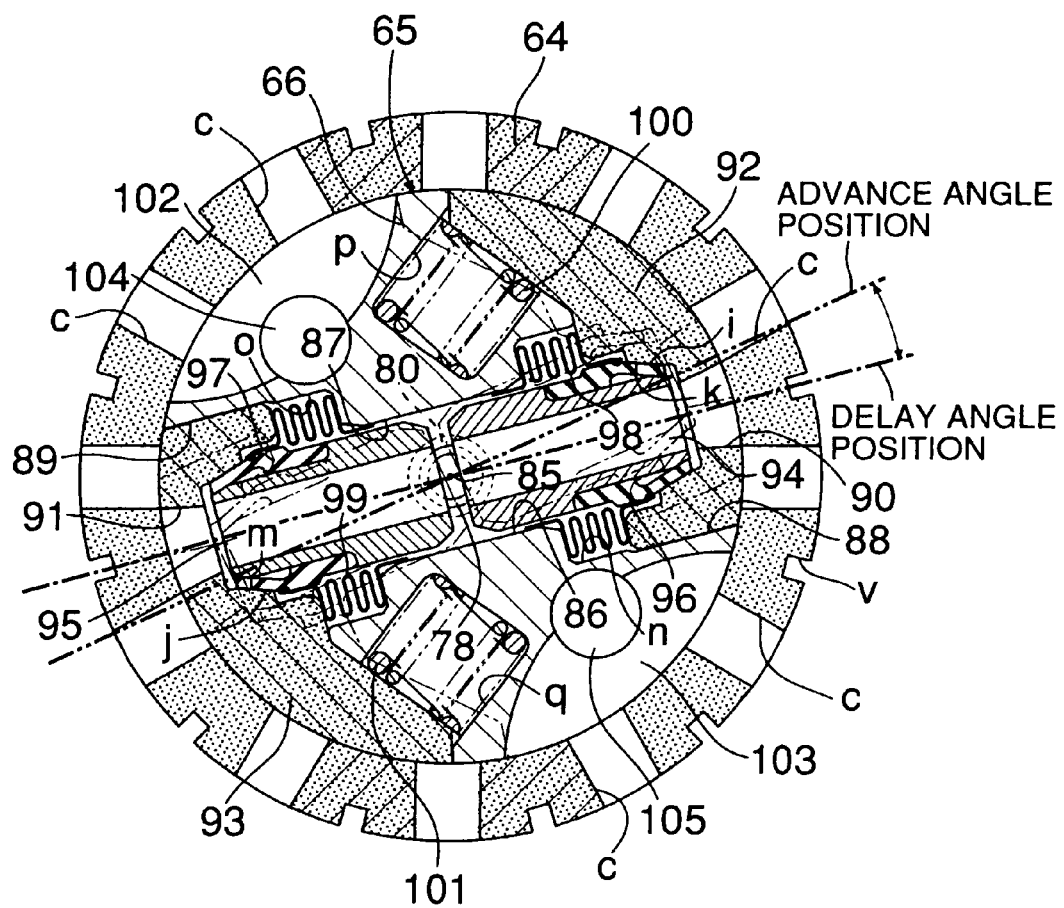

FIG. 13 shows the structure of the rotary valve V that supplies vapor into and discharges vapor from each of the cylinder members 39 of the expander 4 with predetermined timing. Formed within the large diameter solid part 66 are first and second holes 86, 87 that extend in opposite directions from a space 85 communicating with the hollow connection tube 78 and that open on the base surfaces of first and second recesses 88, 89 opening on the outer periphery of the large diameter solid part 66. Mounted in the first and second recesses 88, 89 are first and second sealing blocks 92, 93 made of carbon and having inlets 90, 91, the outer peripheries of the first and second sealing blocks 92, 93 sliding on the inner periphery of the hollow shaft 64. Coaxially positioned first and second short supply pipes 94, 95 are inserted with a clearance within the first and second holes 86, 87, and tapered outer peripheries i, j of first and second sealing tubes 96, 97 fitted around the outer peripheries on the forward ends of the first and second supply pipes 94, 95 are fitted into the inner peripheries of tapered holes k, m present inside the inlets 90, 91 of the first and second sealing blocks 92, 93 and communicating with the inlets 90, 91. Formed in the large diameter solid part 66 so as to face the first and second sealing blocks 92, 93 are first and second annular recesses n, o and first and second blind hole-form recesses p, q adjoining thereto, the first and second annular recesses n, o surrounding the first and second supply pipes 94, 95; housed in the first and second annular recesses n, o are first and second bellows-form resilient bodies 98, 99, one end thereof being fitted onto the outer peripheries of the first and second sealing tubes 96, 97; housed in the first and second blind hole-form recesses p, q are first and second coil springs 100, 101; and pressed against the inner periphery of the hollow shaft 64 by the resilient forces of the first and second bellows-form resilient bodies 98, 99 and the first and second coil springs 100, 101 are the first and second sealing blocks 92, 93.

Formed in the large diameter solid part 66 between the first coil spring 100 and the second bellows-form resilient body 99 and between the second coil spring 101 and the first bellows-form resilient body 98 are first and second recessed discharge parts 102, 103 and first and second outlets 104, 105, the first and second recessed discharge parts 102, 103 always communicating with two through holes c, and the first and second outlets 104, 105 extending from the discharge parts 102, 103 in parallel to the introduction tube 80 and opening within a hollow part r of the fixed shaft 65.

As is the case for the first sealing block 92 and the second sealing block 93, members that are of the same type and are described using the words 'first' and 'second' have a centrosymmetric relationship with respect to the axis of the fixed shaft 65.

The interior of the hollow part r of the fixed shaft 65 and the interior of the hollow tube 72 form a passage s for the first reduced temperature, reduced pressure vapor, the passage s communicating with the transit chamber 20 via a plurality of through holes t penetrating the peripheral wall of the hollow tube 72.

As shown in FIG. 2, FIG. 5, FIG. 6, and FIG. 7, rows of first and second infeed holes 107, 108 are formed in the outer peripheral part of the main body 11 of the first half 8 in the vicinity of opposite ends of the minor axis of the rotor chamber 14, the rows of first and second infeed holes 107, 108 being formed from a plurality of radially arranged infeed holes 106, and the first reduced temperature, reduced pressure vapor within the transit chamber 20 is fed into the rotor chamber 14 via these rows of infeed holes 107, 108. Furthermore, nine rows of first outfeed holes 110a to 110i are formed, on the upstream side of the rows of second infeed holes 108 of the rotor chamber 14, on the outer periphery of the main body 11 of the second half 9, the nine rows of first outfeed holes 110a to 110i being formed from a plurality of radially arranged outfeed holes 109, and nine rows of second outfeed holes 111a to 111i are formed on the upstream side of the row of first infeed holes 107, the nine rows of second outfeed holes 111a to 111i being formed from a plurality of radially arranged outfeed holes 109. The nine rows of first outfeed holes 110a to 110i and the nine rows of second outfeed holes 111a to 111i are aligned in the circumferential direction with a predetermined phase difference, and five outfeed holes 109 of each row communicate with each other via communication passages 116.

Four first solenoid valves 117a to 117d are provided for four corresponding communication passages 116 of the four rows of first outfeed holes 110a to 110d on the upstream side but are not provided for the five rows of first outfeed holes 110e to 110i on the downstream side, the four first solenoid valves 117a to 117b independently opening and closing these communication passages 116, and four second solenoid valves 118a to 118d are provided for four corresponding communication passages 116 of the four rows of second outfeed holes 111a to 111d on the upstream side but are not provided for the five rows of second outfeed holes 111e to 111i on the downstream side, the four second solenoid valves 118a to 118b independently opening and closing these communication passages 116. A pressure sensor 119 is provided in each of a total of eight communication passages 116 of the rows of first outfeed holes 110a to 110d and the rows of second outfeed holes 111a to 111d.

The output shaft 23, etc. can be lubricated with water, and a lubrication water passage therefor is arranged as follows. That is, as shown in FIG. 2 and FIG. 3, a water supply pipe 113 is connected to a water supply hole 112 formed in the hollow bearing tube 22 of the second half 9. The water supply hole 112 communicates with a housing 114 that the bearing metal 25 on the second half 9 side faces, the housing 114 further communicates with a water through-hole u formed in the thick portion 62 of the output shaft 23, the water through-hole u further communicates with a plurality of water through-channels v extending in the direction of a generating line on the outer periphery of the hollow shaft 64 (see also FIG. 13), and each of the water through-channels v further communicates with a housing 115 that the bearing metal 25 on the first half 8 side faces. Moreover, provided on the inner end surface of the thick portion 62 of the output shaft 23 is an annular recess w providing communication between the water through-holes u and a sliding portion between the hollow shaft 64 and the large diameter solid part 66 of the fixed shaft 65.

This allows water to provide lubrication between each of the bearing metals 25 and the output shaft 23 and between the hollow shaft 64 and the fixed shaft 65, and the water entering the rotor chamber 14 through the gap between the two bearing metals 25 and the output shaft 23 provides lubrication between the casing 7 and the seal 44 and between the casing 7 and each of the rollers 59.

Figure 4:
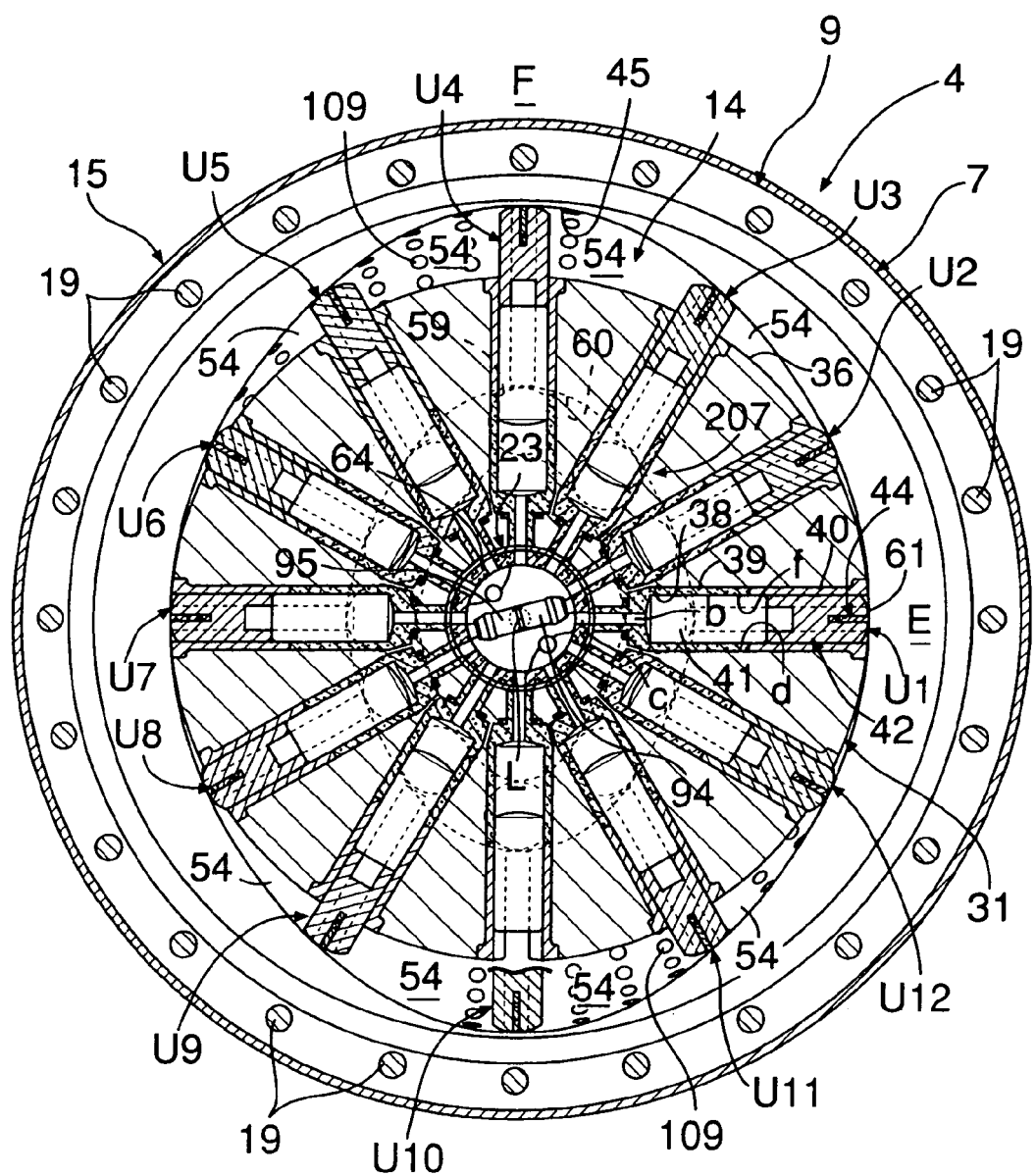

In FIG. 4, the first and seventh vane piston units U1, U7, which are in a centrosymmetric relationship with respect to the rotational axis L of the rotor 31, carry out the same operations. This also applies to the second and eighth vane piston units U2, U8, etc., which are in a centrosymmetric relationship.

For example, referring also to FIG. 13, the axis of the first supply pipe 94 is slightly displaced, in the anticlockwise direction in FIG. 4, from the minor axis position E of the rotor chamber 14, the first vane piston unit U1 is located at the minor axis position E, high temperature, high pressure vapor is not supplied to the large diameter cylinder hole f, and the piston 41 and the vane 42 are therefore at retracted positions.

While the rotor 31 is in this state, rotating it slightly in the anticlockwise direction in FIG. 4 provides communication between the inlet 90 of the first sealing block 92 and the through hole c and allows high temperature, high pressure vapor to enter the large diameter cylinder hole f from the introduction tube 80 through the small diameter hole b. This makes the piston 41 move forward, and this forward movement is converted into rotational movement of the rotor 31 via the vane 42 due to engagement between the rollers 59 integral with the vane 42 and the annular channels 60 as a result of the vane 42 sliding toward a major axis position F of the rotor chamber 14. When the through hole c is displaced from the inlet 90, the high temperature, high pressure vapor expands within the large diameter cylinder hole f to make the piston 41 further move forward, thereby allowing the rotor 31 to continue to rotate. This high temperature, high pressure vapor stops expanding when the first vane piston unit U1 reaches the major axis position F of the rotor chamber 14. The first reduced temperature, reduced pressure vapor within the large diameter cylinder hole f is then discharged into the transit chamber 20 in response to rotation of the rotor 31 via the small diameter hole b, the through hole c, the first recessed discharge part 102, the first outlet 104, the passage s (see FIG. 3), and each of the through holes t as the vane 42 makes the piston 41 retract and subsequently, as shown in FIG. 2 and FIG. 5, it is introduced into the rotor chamber 14 through the row of first infeed holes 107, and further expands between adjoining vanes 42 to rotate the rotor 31, and after that the second reduced temperature, reduced pressure vapor is discharged outward via the rows of first outfeed holes 110a to 110f.

In this way, the piston 41 is operated by expansion of high temperature, high pressure vapor so as to rotate the rotor 31 via the vane 42, the expansion of the reduced temperature, reduced pressure vapor due to a pressure decrease of the high temperature, high pressure vapor also makes the rotor 31 rotate via the vane 42, and the output shaft 23 can thereby produce an output.

Figure 14:
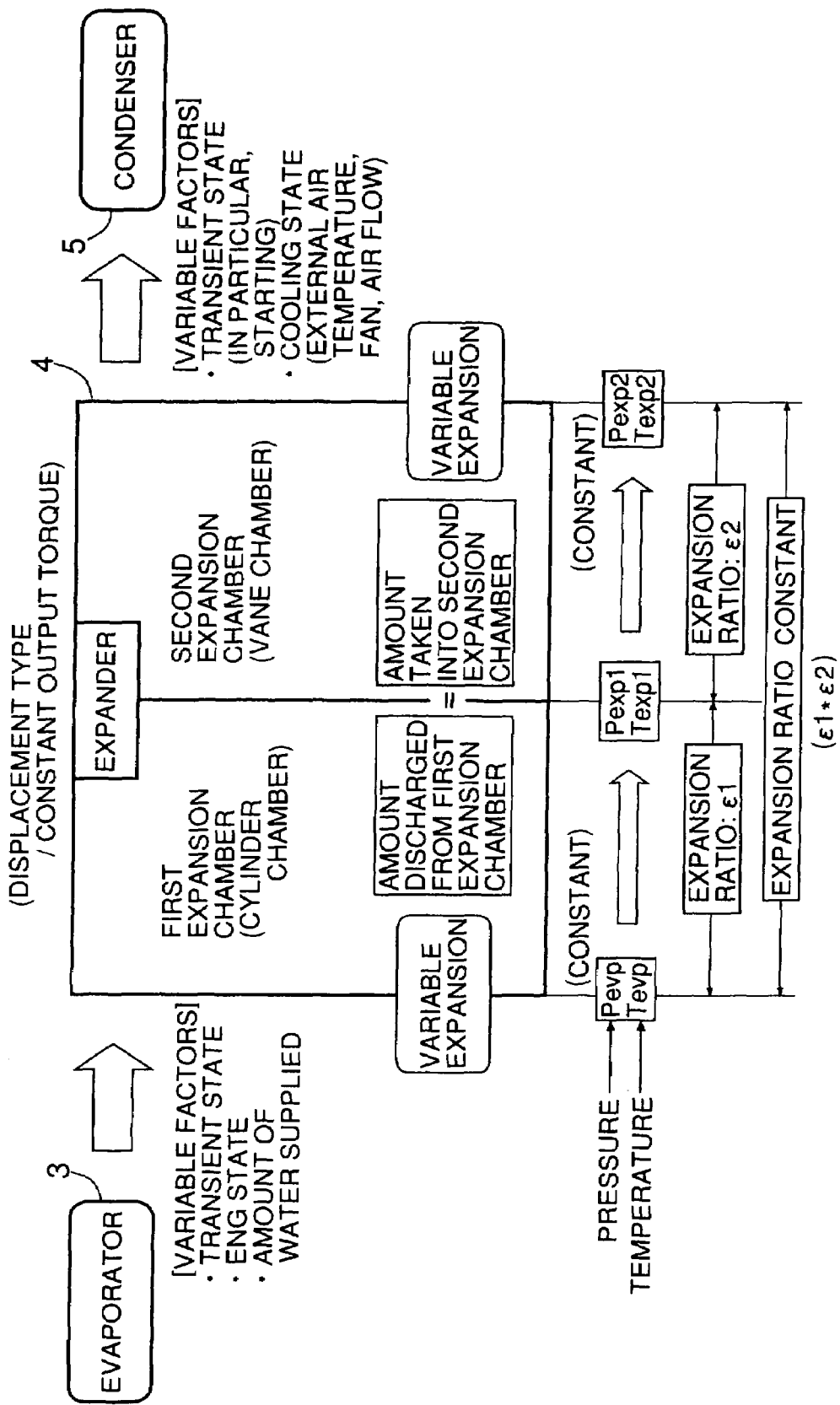
Figure 15:
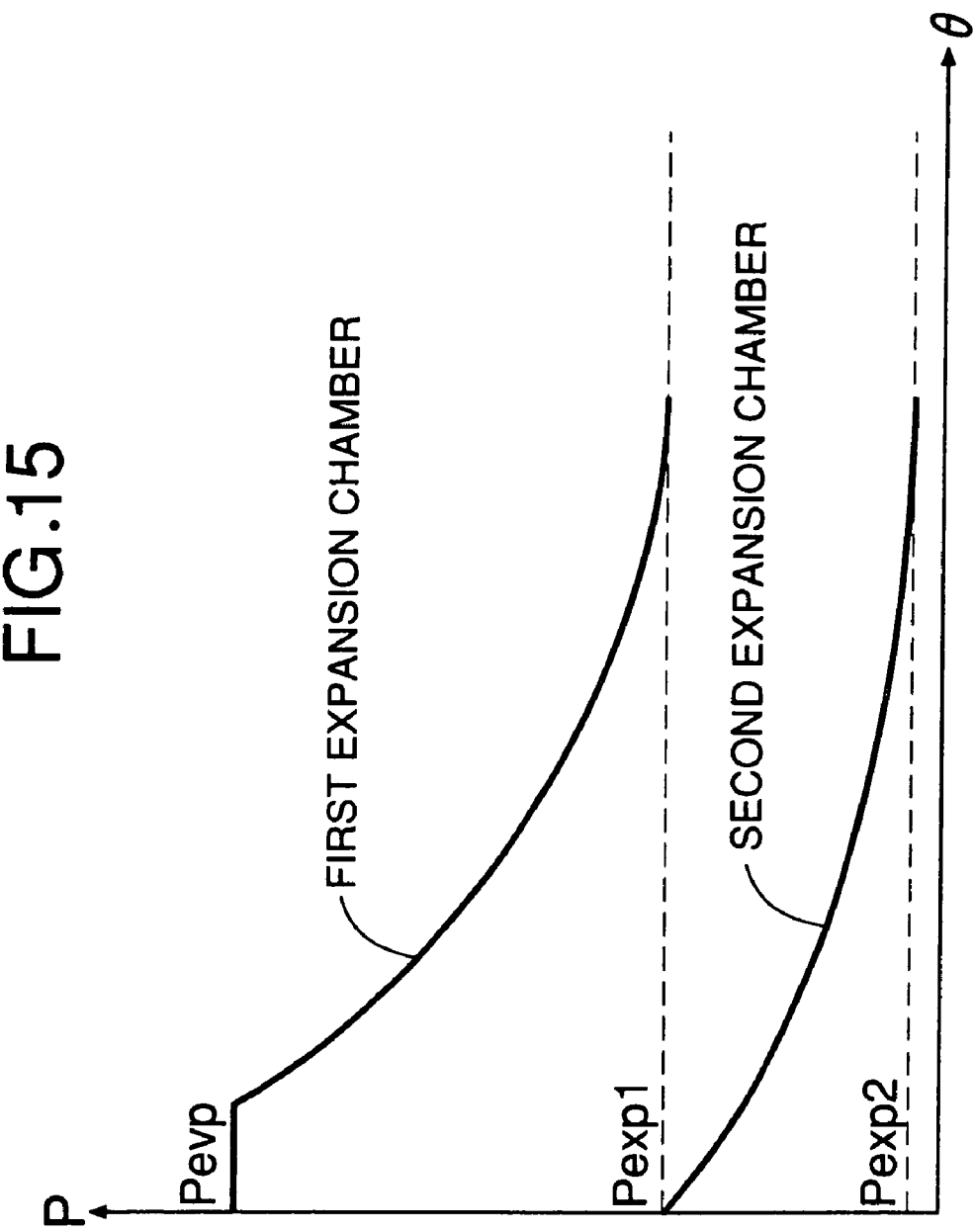

As shown in FIG. 14 and FIG. 15, the expander 4, which is of a displacement type and has a constant shaft torque, includes a first expansion chamber, which is formed from the cylinder chamber of the cylinder member 39, and a second expansion chamber, which is formed from the vane chamber 54. When the pressure and the temperature of a vapor supplied to the first expansion chamber are represented by Pevp and Tevp respectively, the pressure and the temperature of the vapor supplied to the second expansion chamber are represented by Pexp1 and Texp1 respectively, and the pressure and the temperature of the vapor discharged from the second expansion chamber are represented by Pexp2 and Texp2 respectively, then the total expansion ratio of the expander 4, which is given by the product $\epsilon 1 \times \epsilon 2$ of the first expansion chamber expansion ratio $\epsilon 1$ that is determined by Pevp and Pexp1 and the second expansion chamber expansion ratio $\epsilon 2$ that is determined by Pexpi and Pexp2, coincides with a set expansion ratio $\epsilon$ (132 in this embodiment), which is set in advance. In the graph of FIG. 15, the ordinate denotes the pressure P of the vapor, and the abscissa denotes the phase E of the rotor 31. A vapor whose pressure P is adjusted to Pevp is supplied to the first expansion chamber, and when the vapor expands there and the pressure P decreases to Pexp1, the expansion ratio, which is determined by Pevp and Pexp1, becomes the above-mentioned $\epsilon 1$. The vapor having a pressure P of Pexp1 is supplied to the second expansion chamber, and when the vapor expands there and the pressure P decreases to Pexp2, the expansion ratio, which is determined by Pexp1 and Pexp2 becomes the above-mentioned $\epsilon 2$.

Figure 16:
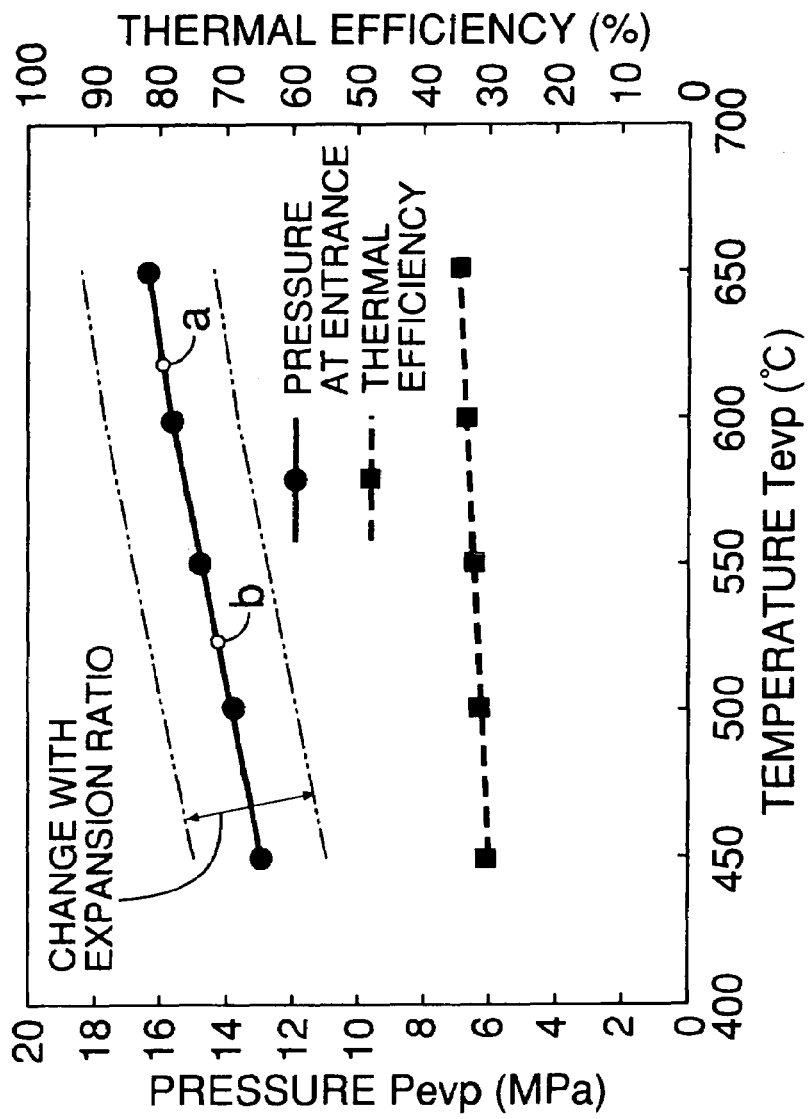

The pressure Pevp and the temperature Tevp of the vapor generated by the evaporator 3, that is, the vapor supplied to the first expansion chamber, are controlled so as to maintain a predetermined relationship shown by the solid line in FIG. 16. That is, the pressure Pevp and the temperature Tevp of the vapor supplied to the first expansion chamber vary according to the transient state of the evaporator 3, the operational state of the internal combustion engine 1, the amount of water supplied to the evaporator 3, etc., but the pressure Pevp of the vapor can be controlled by the rotational speed (shaft torque) of the expander 4 and the temperature Tevp of the vapor can be controlled by the amount of water supplied to the evaporator 3, and the rated values in the present embodiment are set at point a (pressure Pevp=16 MPa and temperature Tevp=620° C.) on the solid line in FIG. 16. When the pressure Pevp and the temperature Tevp of the vapor supplied to the first expansion chamber are determined in this way, the shaft torque of the expander 4 is accordingly determined. As shown by the broken line in FIG. 16, the higher the pressure Pevp and the temperature Tevp of the vapor supplied to the first expansion chamber, the higher the thermal efficiency, but since if the temperature Tevp is high, durability, etc. is affected, the rated value is set at 620° C. in the present embodiment as described above. On the other hand, the pressure Pexp2 and the temperature Texp2 of the vapor discharged from the second expansion chamber are also set at rated values that can make the expander 4 and the condenser 5 exhibit the maximum performance, and the rated values in the present embodiment for the pressure Pexp2 and the temperature Texp2 are 0.05 MPa and 80° C. respectively. However, the, optimum pressure Pexp2 and temperature Texp2 depend on the transient state of the condenser 5, the cooling state of the condenser 5 (temperature of external air, rotational speed of a cooling fan, strength of air flow), etc., and do not always coincide with the above rated values.

Setting the pressure Pevp and the temperature Tevp of the vapor that is supplied to the first expansion chamber at the rated values (Pevp=16 MPa and Tevp=620° C.) and the expansion ratio of the expander 4 at the set expansion ratio $\epsilon$ makes the pressure Pexp2 and the temperature Texp2 of the vapor that is discharged from the second expansion chamber coincide with the rated values (in the present embodiment, Pexp2=0.05 MPa and Texp2=80° C.), thereby enabling the expander 4 and the condenser 5 to exhibit maximum performance. Even when the pressure Pevp and the temperature Tevp of the vapor that is supplied to the first expansion chamber fall outside the rated values, if they are at a position on the solid line in FIG. 16 and the expansion ratio coincides with the set expansion ratio $\epsilon$=132, the pressure Pexp2 and the temperature Texp2 of the vapor that is discharged from the second expansion chamber coincide with the rated values. That is, even when the internal combustion engine 1 is warming up and the pressure Pevp and the temperature Tevp of the vapor that is supplied to the first expansion chamber are lower than the rated values (for example, point b on the solid line in FIG. 16), the pressure Pexp2 and the temperature Texp2 of the vapor that is discharged from the second expansion chamber coincide with the rated values. As a result, the warm-up time from starting the internal combustion engine 1 to a time at which the Rankine cycle system becomes operable can be shortened.

As hereinbefore described, setting the pressure Pevp and the temperature Tevp of the vapor supplied to the first expansion chamber so as to have a predetermined relationship (the relationship denoted by the solid line in FIG. 16) and setting the expansion ratio of the expander 4 at the set expansion ratio $\epsilon$ can make the pressure Pexp2 and the temperature Texp2 of the vapor discharged from the second expansion chamber always coincide with the rated values (in the present embodiment, Pexp2=0.05 MPa and Texp2=80° C.), thereby enabling the expander 4 and the condenser 5 to exhibit maximum performance.

In a case where, due to various variable factors, the pressure Pevp and the temperature Tevp of the vapor supplied to the first expansion chamber are displaced from the relationship denoted by the solid line in FIG. 16 to the relationship denoted by the chain lines, if the expansion ratio of the expander 4 remains at the set expansion ratio $\epsilon$, then the pressure Pexp2 and the temperature Texp2 of the vapor discharged from the second expansion chamber will fall outside the rated values, and there is a possibility that the expander 4 and the condenser 5 might not be able to exhibit satisfactory performance. On the other hand, in a case where, due to various variable factors, the optimum values for the pressure Pexp2 and the temperature Texp2 of the vapor discharged from the second expansion chamber fall outside the rated values, if the expansion ratio of the expander 4 remains at the set expansion ratio $\epsilon$, then the pressure Pexp2 and the temperature Texp2 of the vapor discharged from the second expansion chamber will have the rated values and fall outside the optimum values, and there is a possibility that the expander 4 and the condenser 5 might not be able to exhibit satisfactory performance.

In such cases, changing the expansion ratio of the expander 4 from the set expansion ratio $\epsilon$ can make the pressure Pexp2 and the temperature Texp2 of the vapor discharged from the second expansion chamber coincide with the optimum values. The expansion ratio of the expander 4 can be changed by changing the intake timing for the first expansion chamber or the discharge timing for the second expansion chamber.

Specifically, in a case where the pressure Pevp of the vapor supplied to the first expansion chamber is too high (see FIG. 21B), the timing with which the vapor is supplied to the first expansion chamber is delayed so as to decrease the expansion ratio $\epsilon$1, and in a case where the pressure Pevp of the vapor supplied to the first expansion chamber is too low (see FIG. 21C), the timing with which the vapor is discharged from the second expansion chamber is advanced so as to decrease the expansion ratio $\epsilon$2.

The expansion ratio $\epsilon$1 of the vapor in the first expansion chamber can be changed by changing the intake timing for the vapor by means of the rotary valve V. That is, when the motor 82 rotates the fixed shaft 65 so that the phase of the inlets 90, 91 of the fixed shaft 65 are changed toward the delay angle side in FIG. 13 so as to advance the timing with which the vapor is supplied from the evaporator 3 to the cylinder member 39 of the expander 4, since the piston 41 is on the radially inward side at the instant when the vapor is introduced and the volume of the cylinder member 39 decreases, the amount of vapor supplied to the cylinder member 39 decreases, and the expansion ratio $\epsilon$1 in the first expansion chamber (cylinder member 39) of the expander 4 increases. Conversely, when the motor 82 rotates the fixed shaft 65 so that the phase of the inlets 90, 91 thereof are changed toward the advance angle side in FIG. 13 so as to delay the timing with which the vapor is supplied from the evaporator 3 to the cylinder member 39 of the expander 4, since the piston 41 is on the radially outward side at the instant when the vapor is introduced and the volume of the cylinder member 39 increases, the amount of vapor supplied to the cylinder member 39 increases, and the expansion ratio $\epsilon$1 in the first expansion chamber (the cylinder member 39) of the expander 4 decreases. In this way, changing the timing with which the vapor is introduced into the first expansion chamber can change the expansion ratio $\epsilon$1 thereof.

The vapor discharged from the first expansion chamber is supplied to the second expansion chamber (the vane chamber 54) via the transit chamber 20, and the amount of vapor discharged from the first expansion chamber therefore coincides with the amount of vapor supplied to the second expansion chamber. The timing with which the vapor is discharged from the second expansion chamber into the condenser 5 can be controlled by selectively opening and closing the eight solenoid valves 117a to 117d, 118a to 118d. For example, at a position a little before the position at which the vane chamber 54 has the maximum volume in FIG. 7, among the pair of vanes 42 forming the vane chamber 54, the vane 42 on the rotationally advanced side is beyond the third row of first outfeed holes 110c, and this position is defined as a reference timing. That is, under rated conditions the solenoid valves 117a, 117b for the two upstream side rows of first outfeed holes 110a, 110b are closed, the solenoid valves 117c, 117d for the two downstream side rows of first outfeed holes 110c, 110d are open, and at the instant when the vane 42 on the rotationally advanced side passes over the third row of first outfeed holes 110c the vapor starts discharging from the third row of first outfeed holes 110c.

In order to advance the discharge timing relative to the reference timing, the solenoid valve 117b for the second row of first outfeed holes 110b on the upstream side may be opened, and in order to further advance the discharge timing, in addition to the solenoid valve 117b for the second row of first outfeed holes 110b, the solenoid valve 117a for the first row of first outfeed holes 110a on the upstream side may be opened. Conversely, in order to delay the discharge timing relative to the reference timing, the solenoid valve 117c for the third row of first outfeed holes 110c may be closed, and in order to further delay the discharge timing, in addition to the solenoid valve 117c for the third row of first outfeed holes 110c, the solenoid valve 117d for the fourth row of first outfeed holes 110d on the downstream side may be closed.

Increasing the number of the solenoid valves 117a to 117d that are closed in this way successively from the upstream side can delay stepwise the timing with which the vapor is discharged from the second expansion chamber into the condenser 5, thereby increasing the expansion ratio $\epsilon 2$ in the second expansion chamber. Conversely, increasing the number of the solenoid valves 117a to 117d that are opened successively from the downstream side can advance stepwise the timing with which the vapor is discharged from the second expansion chamber into the condenser 5, thereby decreasing the expansion ratio $\epsilon 2$ in the second expansion chamber.

Control of the second solenoid valves 118a to 18d for the rows of second outfeed holes 111a to 111d is carried out in the same manner as for the above-mentioned control of the solenoid valves 117a to 117d for the rows of first outfeed holes 110a to 110d. The control of the solenoid vales 117a to 117d, and 118a to 118d is carried out, based on outputs from the eight pressure sensors 119 provided so as to correspond to the eight rows of outfeed holes 110a to 110d, 111a to 111d, so that the pressure Pexp2 of the vapor discharged from the second expansion chamber coincides with the optimum value at which the expander 4 and the condenser 5 can exhibit maximum performance.

With regard to states of the vapor determined by its pressure, volume, and temperature, there are a saturated vapor region in which water and vapor are present as a mixture and a superheated vapor region in which no water is present and vapor alone is present. The region from the entrance to the exit of the first expansion chamber corresponds to the superheated vapor region, and no water is present in the vapor. It is therefore possible to reliably prevent water residing within the cylinder member 39 forming the first expansion chamber from being compressed by the piston 41 and thereby causing the phenomenon of water hammer. Within the region from the entrance to the exit of the second expansion chamber, at least the most downstream part corresponds to the saturated vapor region, and water is present in the vapor. A slight amount of water therefore resides within the vane chamber 54 forming the second expansion chamber, thereby improving the lubrication performance and sealing performance between the vane 42 and the rotor chamber 14.

Figure 17:
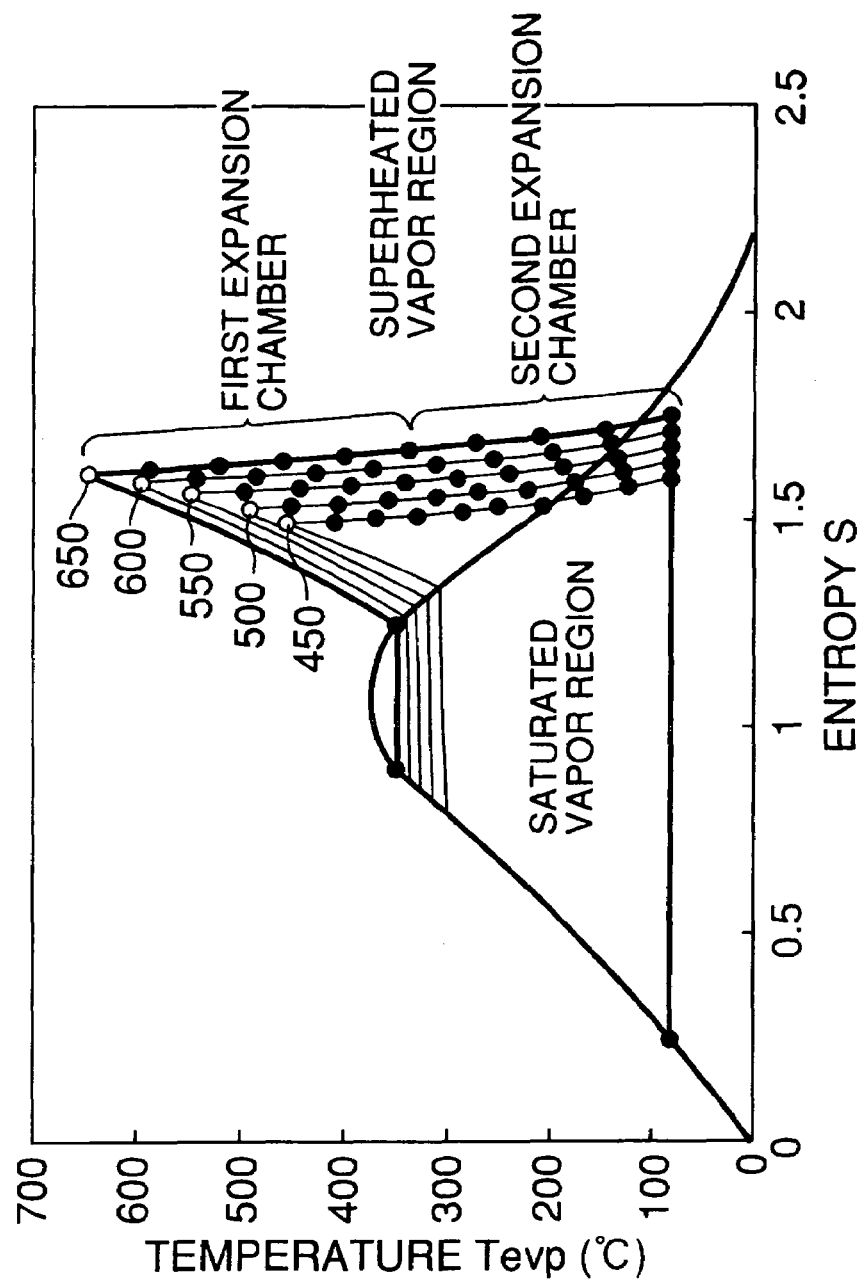
Figure 18:
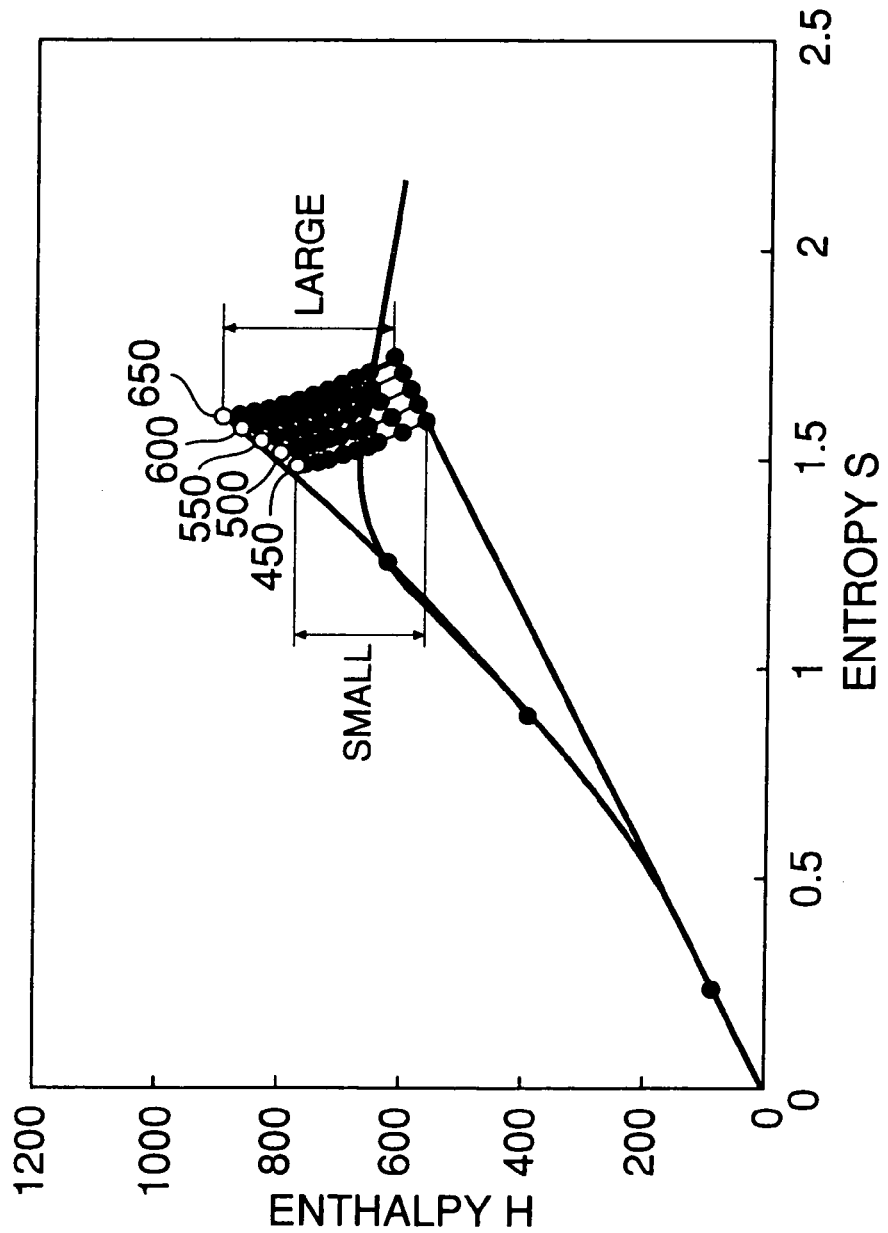
Figure 19:
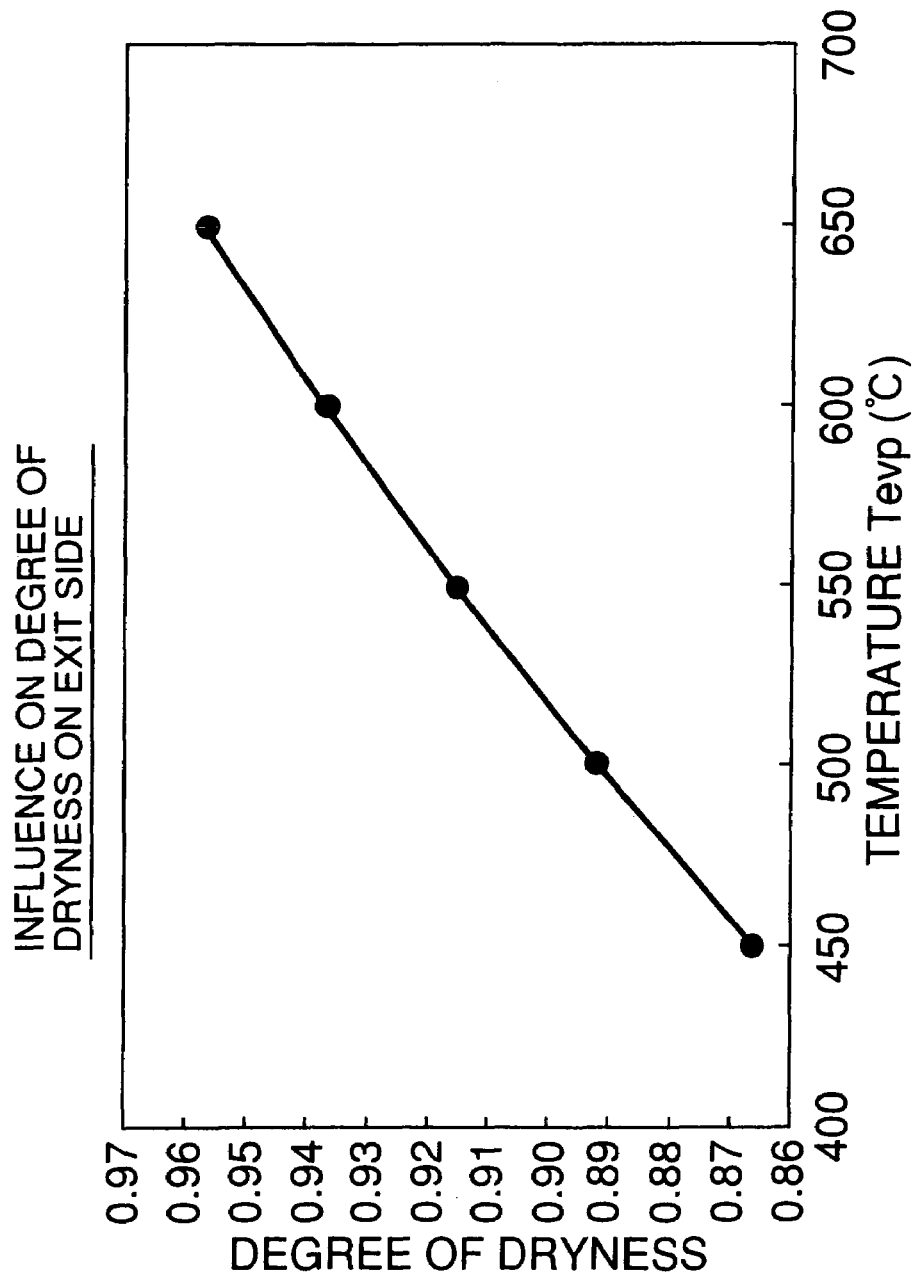

As shown in FIG. 17 to FIG. 19, when the temperature Tevp of the vapor supplied to the first expansion chamber is changed in the range of 450° C. to 650° C., the higher the temperature Tevp, the wider the superheated vapor region within the expander 4, the timing of shifting from the superheated vapor region to the saturated vapor region is delayed (see FIG. 17), the decrease in enthalpy increases and the output from the expander 4 increases (see FIG. 18), and the degree of dryness at the exit of the second expansion chamber increases and the amount of water generated decreases (see FIG. 19). Conversely, the lower the temperature Tevp, the narrower the superheated vapor region within the expander 4, the timing of shifting from the superheated vapor region to the saturated vapor region advances, the decrease in enthalpy decreases and the output from the expander 4 decreases, and the degree of dryness at the exit of the second expansion chamber decreases and the amount of water generated increases. The boundary between the first expansion chamber and the second expansion chamber is in the superheated vapor region, and it is therefore possible to reliably suppress the residence of water in the first expansion chamber, which is formed from the cylinder member 39, and reliably ensure that water resides in the second expansion chamber, which is formed from the vane chamber 54.

When it is detected that the temperature Tevp at the entrance of the first expansion chamber is higher than the rated value, since the pressure Pexp2 at the exit of the second expansion chamber becomes higher than the rated value, either the intake timing at the entrance of the first expansion chamber is delayed, thus reducing the expansion ratio $\epsilon 1$, or the discharge timing at the exit of the second expansion chamber is delayed, thus increasing the expansion ratio $\epsilon 2$. Conversely, when it is detected that the temperature Tevp at the entrance of the first expansion chamber is lower than the rated value, since the pressure Pexp2 at the exit of the second expansion chamber becomes lower than the rated value, either the intake timing at the entrance of the first expansion chamber is advanced, thus increasing the expansion ratio $\epsilon 1$, or the discharge timing at the exit of the second expansion chamber is delayed, thus decreasing the expansion ratio $\epsilon 2$.

When the leak rate within the expander 4 is large (at a time of low speed rotation), variable expansion ratio control may be carried out in the same manner as with the above-mentioned case where the temperature Tevp at the entrance of the first expansion chamber is higher than the rated value, and conversely when the leak rate within the expander 4 is small (at a time of high speed rotation), variable expansion ratio control may be carried out in the same manner as with the above-mentioned case where the temperature Tevp at the entrance of the first expansion chamber is lower than the rated value.

Figure 20:
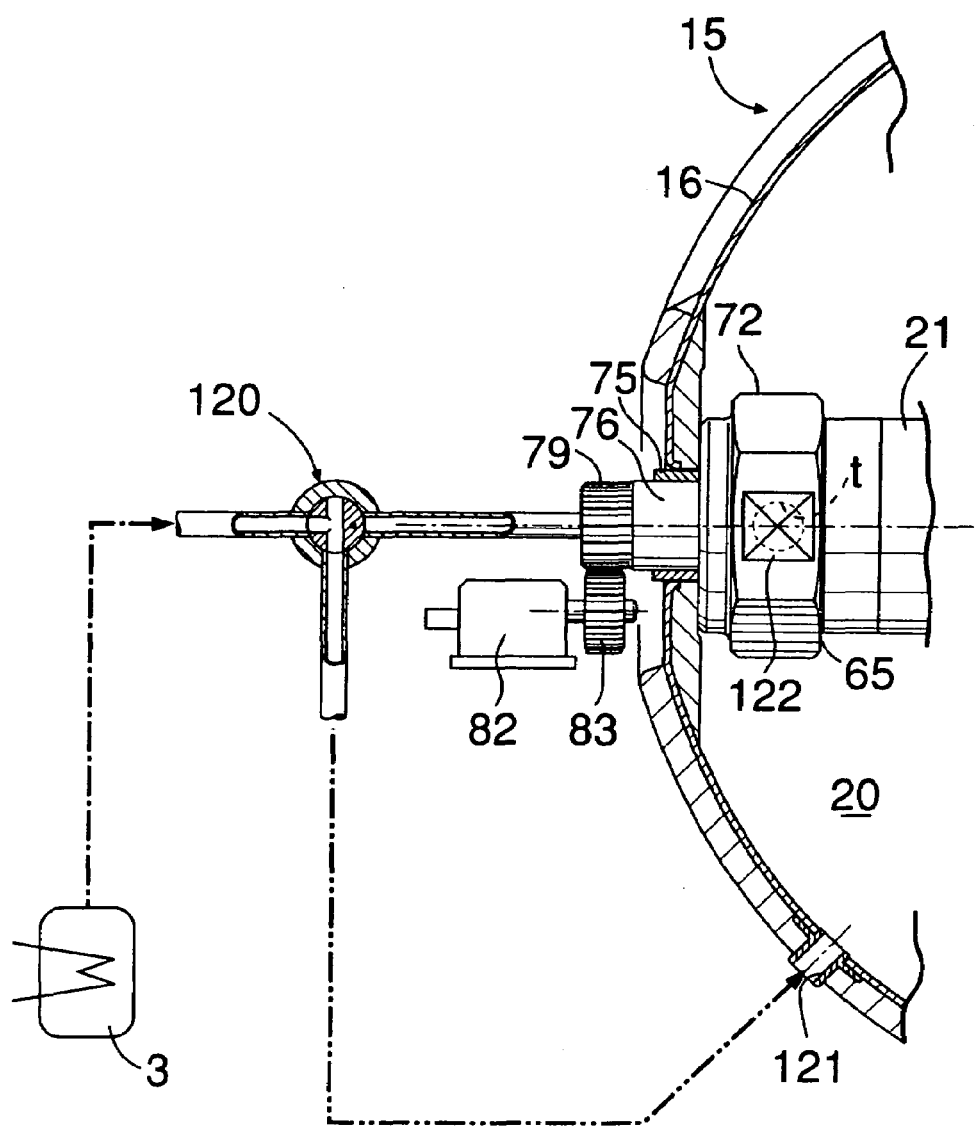
FIG. 20 is a diagram showing a second embodiment of the present invention.

A second embodiment of the present invention is now explained by reference to FIG. 20.

In the expander 4 of the first embodiment, high temperature, high pressure vapor is firstly supplied to the cylinder member 39, which is the first expansion chamber, and the first reduced temperature, reduced pressure vapor obtained as a result of temperature and pressure reductions of the above vapor is then supplied to the vane chamber 54, which is the second expansion chamber. On the other hand, in the second embodiment shown in FIG. 20, the through hole t, via which the first reduced temperature, reduced pressure vapor from the first expansion chamber is discharged into the transit chamber 20, can be closed by a solenoid valve 122 and, furthermore, supply of high temperature, high pressure vapor to the first expansion chamber is cut off by means of a change-over valve 120 so that the high temperature, high pressure vapor can be supplied directly to a vapor inlet 121 of the transit chamber 20, thereby stopping operation of the first expansion chamber and enabling the second expansion chamber alone to operate independently. In this case, the expansion ratio of the vapor in the expansion chamber formed by the vane chamber 54 can be controlled by changing the exhaust timing of the vane chamber 54 by means of the solenoid valves 117a to 117d, 118a to 118d.

Although embodiments of the present invention are explained in detail above, the present invention can be modified in a variety of ways without departing from the spirit and scope of the present invention.

For example, in the embodiments the first expansion chamber and the second expansion chamber are connected to each other in line, but it is also possible to connect three or more expansion chambers in line. In this case, it is necessary for the vapor supplied to the expansion chamber on the most upstream side to be in the superheated vapor region, and for the vapor discharged from the expansion chamber on the most downstream side to be in the saturated vapor region.

INDUSTRIAL APPLICABILITY

As hereinbefore described, the Rankine cycle system related to the present invention can be preferably applied in a case where the exhaust gas of an internal combustion engine is used as a heat source, but the heat source is not limited to the exhaust gas of the internal combustion engine.

What is claimed is:

1. A Rankine cycle system that includes an evaporator (3) for heating a liquid and generating a vapor, an expander (4) for expanding the vapor supplied from the evaporator (3) and outputting a shaft torque, and a condenser (5) for cooling the vapor discharged from the expander (4) and turning the vapor back into the liquid, wherein with regard to a given relationship between pressure (Pevp) and temperature (Tevp) of the vapor that is taken into the expander (4), an expansion ratio ($\epsilon 1$, $\epsilon 2$) of the vapor that is taken into and discharged from the expander (4) is set at a predetermined expansion ratio ($\epsilon$) according to the given relationship so that pressure (Pexp2) and temperature (Texp2) of the vapor that is discharged from the expander (4) coincide with target values, wherein the expander (4) includes an expansion chamber (39) that has the vapor at a discharge position thereof in a superheated vapor region, and the expansion chamber (39) is formed from a cylinder chamber.

2. The Rankine cycle system according to claim 1, wherein the expander (4) includes a plurality of expansion chambers (39, 54) that are connected to each other in line, and the product of the expansion ratios ($\epsilon 1$, $\epsilon 2$) of the vapor in each of the expansion chambers (39, 54) is made to be the set expansion ratio ($\epsilon$).

3. The Rankine cycle system according to claim 2, wherein, among the plurality of expansion chambers (39, 54) of the expander (4), the vapor of at least the expansion chamber (39) on the most upstream side is in the superheated vapor region, and the vapor of at least the expansion chamber (54) on the most downstream side is in a saturated vapor region.

4. The Rankine cycle system according to claim 3, wherein the expansion chamber (54) that has the vapor at a discharge position thereof in the saturated vapor region is formed from a vane chamber.

5. The Rankine cycle system according to claim 2, wherein, among the plurality of expansion chambers (39, 54) of the expander (4), an intake position of at least the expansion chamber (39) on the most upstream side is made variable.

6. The Rankine cycle system according to claim 2, wherein, among the plurality of expansion chambers (39, 54) of the expander (4), a discharge position of at least the expansion chamber (54) on the most downstream side is made variable.

7. A Rankine cycle system that includes an evaporator (3) for heating a liquid and generating a vapor, an expander (4) for expanding the vapor supplied from the evaporator (3) and outputting a shaft torque, and a condenser (5) for cooling the vapor discharged from the expander (4) and turning the vapor back into the liquid, wherein, with regard to a given relationship between the pressure (Pevp) and the temperature (Tevp) of the vapor that is taken into the expander (4), an expansion ratio ($\epsilon 1$, $\epsilon 2$) of the vapor that is taken into and discharged from the expander (4) is set at a predetermined expansion ratio ($\epsilon$) according to the given relationship so that the pressure (Pexp2) and the temperature (Texp2) of the vapor that is discharged from the expander (4) coincide with target values, wherein the expander (4) includes a plurality of expansion chambers (39, 54) that are connected to each other in line, and the product of the expansion ratios ($\epsilon 1$, $\epsilon 2$) of the vapor in each of the expansion chambers (39, 54) is made to be the set expansion ratio ($\epsilon$), wherein, among the plurality of expansion chambers (39, 54) of the expander (4), an intake position of at least the expansion chamber (39) on the most upstream side is made variable.

8. A Rankine cycle system that includes an evaporator (3) for heating a liquid and generating a vapor, an expander (4) for expanding the vapor supplied from the evaporator (3) and outputting a shaft torque, and a condenser (5) for cooling the vapor discharged from the expander (4) and turning the vapor back into the liquid, wherein, with regard to a given relationship between the pressure (Pevp) and the temperature (Tevp) of the vapor that is taken into the expander (4), an expansion ratio ($\epsilon 1$, $\epsilon 2$) of the vapor that is taken into and discharged from the expander (4) is set at a predetermined expansion ratio ($\epsilon$) according to the given relationship so that the pressure (Pexp2) and the temperature (Texp2) of the vapor that is discharged from the expander (4) coincide with target values, wherein the expander (4) includes a plurality of expansion chambers (39, 54) that are connected to each other in line, and the product of the expansion ratios ($\epsilon 1$, $\epsilon 2$) of the vapor in each of the expansion chambers (39, 54) is made to be the set expansion ratio ($\epsilon$), wherein, among the plurality of expansion chambers (39, 54) of the expander (4), a discharge position of at least the expansion chamber (54) on the most downstream side is made variable.

9. The Rankine cycle system according to claim 7, wherein, among the plurality of expansion chambers (39, 54) of the expander (4), the vapor of at least the expansion chamber (39) on the most upstream side is in a superheated vapor region, and the vapor of at least the expansion chamber (54) on the most downstream side is in a saturated vapor region.

10. The Rankine cycle system according to claim 7, wherein the expansion chamber (54) that has vapor at a discharge position thereof in a saturated vapor region is formed from a vane chamber.

11. The Rankine cycle system according to claim 7, wherein, among the plurality of expansion chambers (39, 54) of the expander (4), a discharge position of at least the expansion chamber (54) on the most downstream side is made variable.

12. The Rankine cycle system according to claim 8, wherein, among the plurality of expansion chambers (39, 54) of the expander (4), the vapor of at least the expansion chamber (39) on the most upstream side is in a superheated vapor region, and the vapor of at least the expansion chamber (54) on the most downstream side is in a saturated vapor region.

13. The Rankine cycle system according to claim 12, wherein the expansion chamber (39) that has the vapor at a discharge position thereof in the superheated vapor region is formed from a cylinder chamber.

14. The Rankine cycle system according to claim 12, wherein the expansion chamber (54) that has the vapor at a discharge position thereof in the saturated vapor region is formed from a vane chamber.

15. The Rankine cycle system according to claim 8, wherein, among the plurality of expansion chambers (39, 54) of the expander (4), an intake position of at least the expansion chamber (39) on the most upstream side is made variable.

16. The Rankine cycle system according to claim 1, wherein the pressure (Pevp) and the temperature (Tevp) of the vapor taken into the expander (4) are in a superheated vapor region, and the pressure (Pexp2) and the temperature (Texp2) of the vapor discharged from the expander (4) are in a saturated vapor region.

* * * * *